(12) United States Patent
Street et al.

(10) Patent No.: US 9,631,693 B2
(45) Date of Patent: Apr. 25, 2017

(54) LATERAL SUPPORT ELEMENT, GAS SPRING ASSEMBLY AND METHOD

(71) Applicant: FIRESTONE INDUSTRIAL PRODUCTS COMPANY, LLC, Indianapolis, IN (US)

(72) Inventors: Stephen C. Street, Carmel, IN (US); Pradipta N. Moulik, Carmel, IN (US)

(73) Assignee: Firestone Industrial Products Company, LLC, Indianapolis, IN (US)

( * ) Notice: Subject to any disclaimer, the term of this patent is extended or adjusted under 35 U.S.C. 154(b) by 0 days.

(21) Appl. No.: 14/413,978

(22) PCT Filed: Jul. 12, 2013

(86) PCT No.: PCT/US2013/050356
§ 371 (c)(1),
(2) Date: Jan. 9, 2015

(87) PCT Pub. No.: WO2014/012048
PCT Pub. Date: Jan. 16, 2014

(65) Prior Publication Data
US 2015/0167772 A1     Jun. 18, 2015

Related U.S. Application Data

(60) Provisional application No. 61/670,782, filed on Jul. 12, 2012, provisional application No. 61/672,066, filed on Jul. 16, 2012.

(51) Int. Cl.
*F16F 9/04*     (2006.01)
*F16F 9/05*     (2006.01)
(Continued)

(52) U.S. Cl.
CPC ............ *F16F 9/0454* (2013.01); *B60G 11/27* (2013.01); *B61F 5/307* (2013.01); *F16F 9/05* (2013.01)

(58) Field of Classification Search
CPC ..... F16F 9/04; F16F 9/05; F16F 9/084; B61F 5/10
(Continued)

(56) References Cited

U.S. PATENT DOCUMENTS 3,904,181 A * 9/1975 Harsy-Vadas .......... B60G 11/30
                                                      267/3
4,844,429 A * 7/1989 Ecktman ................ B21D 24/02
                                                    267/119
(Continued)

FOREIGN PATENT DOCUMENTS

DE     202010008268     10/2010
EP     1015790     7/2000
(Continued)

OTHER PUBLICATIONS

International Search Report and Written Opinion for corresponding patent application No. PCT/US2013/050356 dated Oct. 31, 2013.

*Primary Examiner* — Melanie Torres Williams
(74) *Attorney, Agent, or Firm* — Thomas R. Kingsbury; Fay Sharpe LLP

(57) ABSTRACT

A lateral support element (304) include an element wall with a first surface facing away from an associated flexible wall (264) and a second surface facing toward the associated flexible wall. The lateral support element is disposed along the associated flexible wall such that an interface (334) is formed between an outer surface of the associated flexible wall and the second surface of the lateral support element. The interface is operative to generate a lateral spring-rate profile in an associated gas spring assembly that varies according to lateral displacement of the associated flexible wall and the lateral support element relative to one another. The interface can include a quantity of friction-reducing material and/or can be at least partially formed by a cross-sectional profile of the lateral support element that includes
(Continued)

a convex profile segment. Gas spring assemblies and methods of assembly are also included.

20 Claims, 11 Drawing Sheets

(51) Int. Cl.
 *B60G 11/27* (2006.01)
 *B61F 5/30* (2006.01)
(58) Field of Classification Search
 USPC .......... 267/64.19, 64.26, 64.23, 64.24, 64.27
 See application file for complete search history.

(56) References Cited

U.S. PATENT DOCUMENTS

| | | | |
|---|---|---|---|
| 8,540,220 B2* | 9/2013 | Sawa ........................ | B61F 5/10 |
| | | | 267/3 |
| 2011/0031662 A1* | 2/2011 | Toyama .................... | B61F 5/02 |
| | | | 267/121 |
| 2015/0219177 A1* | 8/2015 | Ura .......................... | F16F 9/04 |
| | | | 267/64.27 |

FOREIGN PATENT DOCUMENTS

| | | | | |
|---|---|---|---|---|
| JP | S55 76237 | 6/1980 | | |
| JP | 2005-199761 | 7/2005 | | |
| JP | 2010-223372 | 10/2010 | | |
| JP | 2012-117637 | 6/2012 | | |
| JP | WO 2015015809 A1 * | 2/2015 | ................ | B61F 5/10 |
| JP | WO 2015115198 A1 * | 8/2015 | ................ | F16F 1/40 |
| JP | WO 2015137460 A1 * | 9/2015 | ................ | B61F 5/10 |

* cited by examiner

LATERAL SUPPORT ELEMENT, GAS SPRING ASSEMBLY AND METHOD

This application is the National Stage of International Application No. PCT/US2013/050356, filed on Jul. 12, 2013, which claims the benefit of priority from U.S. Provisional Patent Application No. 61/670,782 filed on Jul. 12, 2012 and U.S. Provisional Patent Application No. 61/672,066 filed on Jul. 16, 2012, the subject matter of which is hereby incorporated herein by reference in its entirety.

BACKGROUND

The subject matter of the present disclosure broadly relates to the art of spring devices and, more particularly, to interfaces between a flexible wall and a lateral support element of a gas spring assembly. Gas spring assemblies including such interfaces as well as suspension systems for vehicles that include one or more of such gas spring assemblies and methods of assembly are also included.

The subject matter of the present disclosure is capable of broad application and use in connection with a variety of applications and/or environments. However, the subject matter finds particular application and use in conjunction with rail vehicles, and will be described herein with particular reference thereto. However, it is to be appreciated that the subject matter of the present disclosure is amenable to use in connection with other applications and environments.

A suspension system, such as may be used in connection with motorized rail vehicles and/or rolling-stock rail vehicles, for example, can include one or more spring elements for accommodating forces and loads associated with the operation and use of the corresponding device (e.g., a rail vehicle) to which the suspension system is operatively connected. In such applications, it is often considered desirable to utilize spring elements that operate at a lower spring rate, as a reduced spring rate can favorably influence certain performance characteristics, such as vehicle ride quality and comfort, for example. That is, it is well understood in the art that the use of a spring element having a higher spring rate (i.e. a stiffer spring) will transmit a greater magnitude of inputs (e.g., road inputs) to the sprung mass and that, in some applications, this could undesirably affect the sprung mass, such as, for example, by resulting in a rougher, less-comfortable ride of a vehicle. Whereas, the use of spring elements having lower spring rates (i.e., a softer or more-compliant spring) will transmit a lesser amount of the inputs to the sprung mass.

Generally, vehicle performance characteristics, such as ride quality and comfort, are commonly identified as being related to factors, such as spring rate, that are acting in an approximately axial direction in relation to the gas spring assemblies. It has been recognized, however, that relative movement in the lateral direction (i.e., a direction transverse to the axes of the gas spring assemblies) can also influence vehicle performance characteristics, such as ride quality and comfort, for example. In some cases, such lateral movement can include movement of the opposing end members of a gas spring assembly relative to one another in a direction transverse (e.g., perpendicular) to the axis of the gas spring assembly that is formed between the opposing end members.

In some cases, known gas spring assemblies can include a flexible wall and a lateral support element that engages the flexible wall to influence the lateral stiffness rate of the gas spring assemblies. In some cases, known lateral support element designs result in a lower lateral stiffness rate that can permit excessive lateral deflection of the end members relative to one another. While such performance conditions may, in some cases, result in favorable ride quality and comfort, performance characteristics such as vehicle handling and control can be undesirably affected. In other cases, known lateral support element designs result in a higher lateral stiffness rate that can provide favorable vehicle handling and control. However, such high lateral stiffness rates can also generate undesired performance characteristics, such as lower ride quality and/or comfort.

Notwithstanding the widespread usage and overall success of the wide variety of gas spring assemblies including a lateral support element that are known in the art, it is believed that a need exists to meet these competing goals while still retaining comparable or improved ease of manufacture, ease of assembly, ease of installation and/or reduced cost of manufacture.

BRIEF SUMMARY

One example of a lateral support element in accordance with the subject matter of the present disclosure that is dimensioned for use with an associated flexible wall of an associated gas spring assembly can include an element wall with a first surface facing away from an associated flexible wall and a second surface facing toward the associated flexible wall. The lateral support element can be disposed along the associated flexible wall such that an interface is formed between an outer surface of the associated flexible wall and the second surface of the lateral support element. The interface can be operative to generate a lateral spring-rate profile in an associated gas spring assembly that varies according to lateral displacement of the associated flexible wall and the lateral support element relative to one another. The interface can include a quantity of friction-reducing material operatively disposed between the flexible wall and the lateral support element.

Another example of a lateral support element in accordance with the subject matter of the present disclosure that is dimensioned for use with an associated flexible wall of an associated gas spring assembly can include an element wall with a first surface facing away from an associated flexible wall and a second surface facing toward the associated flexible wall. The lateral support element can be disposed along the associated flexible wall such that an interface is formed between an outer surface of the associated flexible wall and the second surface of the lateral support element. The interface can be operative to generate a lateral spring-rate profile in an associated gas spring assembly that varies according to lateral displacement of the associated flexible wall and the lateral support element relative to one another. The interface can be at least partially formed by a cross-sectional profile of the lateral support element that includes a convex profile segment.

One example of a gas spring assembly in accordance with the subject matter of the present disclosure can include a flexible wall having a longitudinal axis and extending peripherally about the longitudinal axis between a first end and a second end spaced longitudinally from the first end. The flexible wall can include an inner surface and an outer surface with the inner surface at least partially defining a spring chamber. A lateral support element can include an element wall with a first surface facing away from the flexible wall and a second surface facing toward the flexible wall. The lateral support element can be disposed along the first end of the flexible wall such that an interface is formed between the outer surface of the flexible wall and the second surface of the lateral support element. The interface can be operative to generate a lateral spring-rate profile that varies according to lateral displacement of the flexible wall and the lateral support element relative to one another. The gas spring assembly can be displaced from a neutral position to a laterally-offset position with the lateral spring-rate decreasing over at least a portion of the displacement from the neutral position to the laterally-offset position. In some cases, the gas spring assembly can include a quantity of friction-reducing material operatively disposed along the interface between the flexible wall and the lateral support element. Additionally, or in the alternative, the lateral support element of the gas spring assembly can, in some cases, have a cross-sectional profile that includes a convex profile segment.

One example of a method of assembling a gas spring assembly in accordance with the subject matter of the present disclosure can include providing a flexible wall having a longitudinal axis and extending peripherally about the longitudinal axis between first and second ends to at least partially form a spring chamber. The method can also include providing a lateral support element and positioning the lateral support element on, along or otherwise adjacent the flexible wall. The method can further include forming an interface between the flexible wall and the lateral support element. The method can also include providing a first end member and securing a first end of the flexible wall on or along the first end member. The method can also include providing a second end member and securing the second end member on or along an end of the flexible wall to at least partially form a spring chamber.

DETAILED DESCRIPTION

Turning now to the drawings, it is to be understood that the showings are for purposes of illustrating examples of the subject matter of the present disclosure and are not intended to be limiting. Additionally, it will be appreciated that the drawings are not to scale and that portions of certain features and/or elements may be exaggerated for purposes of clarity and/or ease of understanding.

Figure 1:
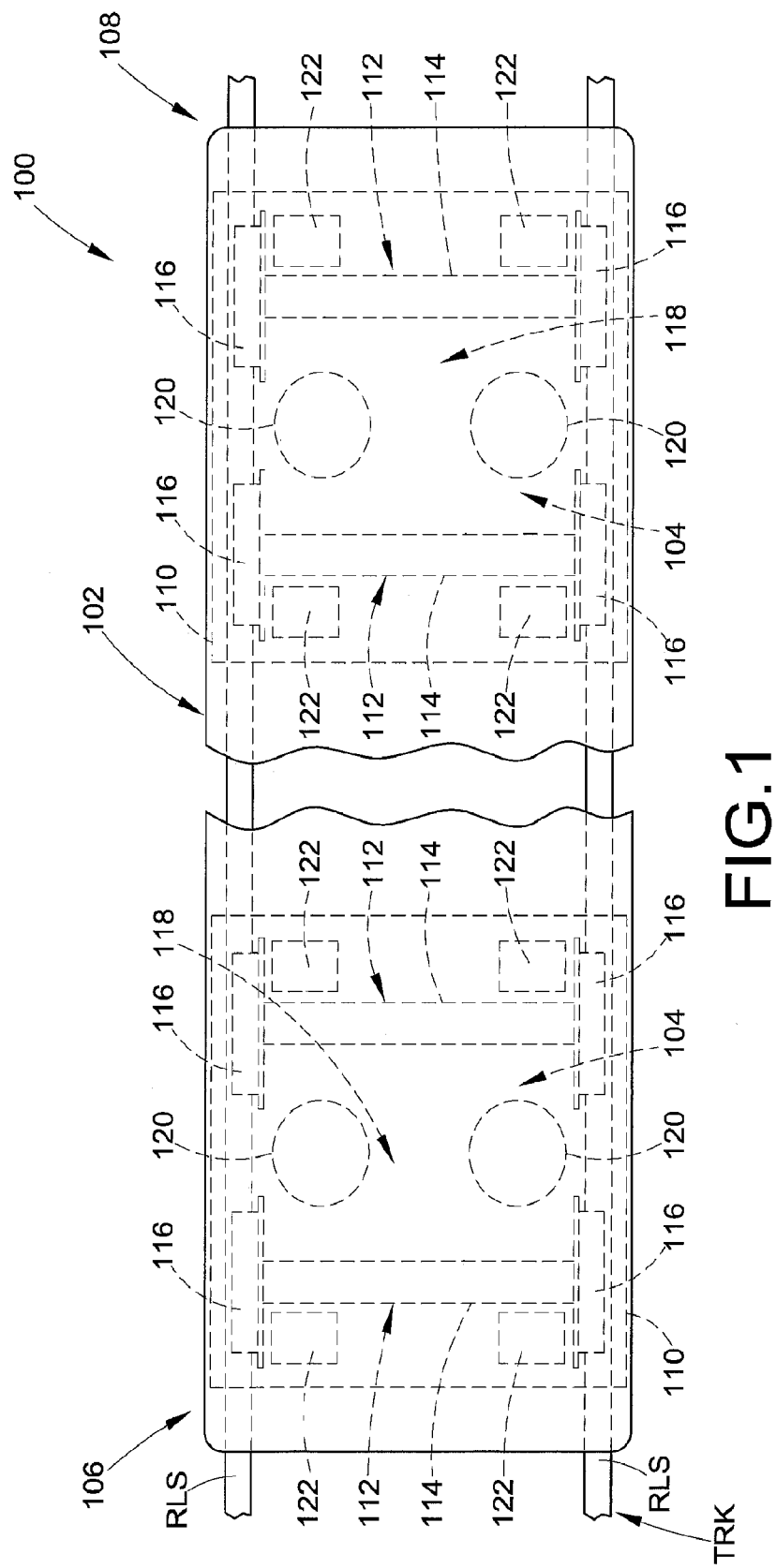
FIG. 1 is a schematic representation of one example of a rail vehicle including a suspension system in accordance with the subject matter of the present disclosure.

FIG. 1 illustrates one example of a vehicle including a suspension system in accordance with the subject matter of the present disclosure, such as a vehicle 100 that is adapted for movement or otherwise displaceable along a track TRK that is at least partially formed by rails RLS of an indefinite length. It will be appreciated that the subject matter of the present disclosure is broadly applicable for use in a wide variety of applications, and that rail vehicle 100 merely represents one example of a suitable application. Rail vehicle 100 is shown being representative of rolling stock (e.g., a railcar) rather than an engine or traction-drive vehicle. However, this representative use is merely exemplary and not intended to be limiting.

Rail vehicle 100 includes a vehicle body 102 supported on one or more frame and wheel assemblies 104, two of which are shown in FIG. 1. In some cases, frame and wheel assemblies 104 may be referred to in the art as "trucks," "rail bogies" or simply "bogies," and such terms may be used herein in an interchangeable manner. Bogies 104 are shown as being disposed toward opposing ends 106 and 108 of rail vehicle 100.

Bogies 104 are shown in FIG. 1 as including a frame 110 as well as one or more wheel sets 112 that are typically formed by an axle 114 and a pair of spaced-apart wheels 116. Normally, bogies 104 include at least two wheel sets, such as is shown in FIG. 1, for example, that are operatively connected to the frame in manner suitable to permit the wheels to roll along rails RLS of track TRK. In many cases, a primary suspension arrangement (not shown) is operatively connected between the wheels sets and the frame to permit relative movement therebetween. Bogies 104 are also shown as including a secondary suspension system 118 that includes at least one gas spring assembly. In the exemplary arrangement shown in FIGS. 1 and 2, bogies 104 include two gas spring assemblies 120 that are operatively connected between frame 110 and vehicle body 102 to permit relative movement therebetween.

Rail vehicles, such as rail vehicle 100, for example, typically include a braking system with one or more brakes operatively associated with each wheel set. In the exemplary arrangement in FIG. 1, two brakes 122 are shown as being operatively associated with each of wheel sets 112 with one brake disposed adjacent each of wheels 116. It will be appreciated, however, that other arrangements could alternately be used.

Additionally, rail vehicles, such as rail vehicle 100, for example, typically include at least one pneumatic system that is operatively associated therewith. In many cases, components of the one or more pneumatic systems can be distributed along the length of a train that is formed from a plurality of rail vehicles, such as one or more traction-drive engines and one or more rolling stock vehicles, for example.

In such cases, each individual rail vehicle will include one or more portions of the pneumatic system. Usually, these one or more portions are serially connected together to form an overall pneumatic system of a train.

Typical pneumatic systems include two or more separately controllable portions, such as a pneumatic braking system that is operatively associated with the vehicle brakes (e.g., brakes 122) and a pneumatic supply system that is operatively associated with the other pneumatically-actuated devices of the rail vehicle, such as the secondary suspension system, for example. As such, rail vehicles typically include a dedicated conduit for each of these two systems. Such conduits normally extend lengthwise along the vehicle body and are often individually referred to as a brake pipe and a supply pipe.

Figure 2:
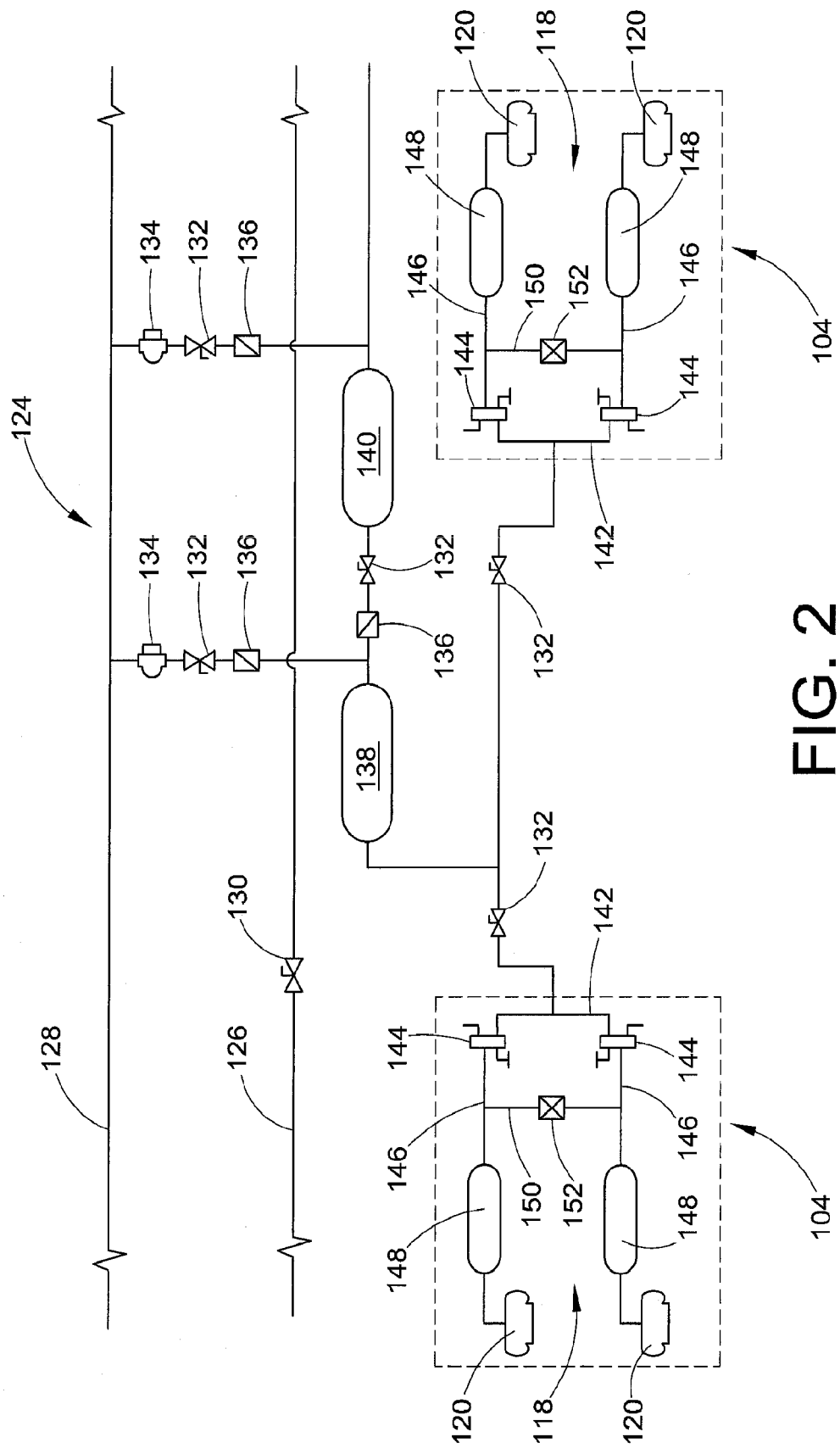
FIG. 2 is a schematic representation of one example of a pneumatic gas system operatively associated with the suspension system in FIG. 1.

FIG. 2 illustrates one example of a pneumatic system 124 that is operatively associated with rail vehicle 100 and includes a braking system (not numbered) with a brake pipe 126 in fluid communication with at least brakes 122 (FIG. 1) and a pneumatic supply system (not numbered) with a supply pipe 128 in fluid communication with at least gas spring assemblies 120 of secondary suspension system 118. It will be recognized and appreciated that pneumatic system 124 will include a wide variety of other components and devices. For example, the braking system can include one or more isolation valves 130 that can be fluidically connected along brake pipe 126. As other examples, the pneumatic supply system can include one or more isolation valves 132, one or more filters 134 and/or one or more non-return valves 136 (which may be alternately referred to as one-way or check valves). The pneumatic supply system can also include one or more reservoirs or other pressurized gas storage devices. In the arrangement shown in FIG. 2, for example, the pneumatic supply system includes a reservoir 138 that is operative to store a quantity of pressurized gas for use in supplying gas spring assemblies 120 of the secondary suspension system, and a reservoir 140 that is operative to store a quantity of pressurized gas for use as the auxiliary reservoir of the braking system.

Generally, certain components of the braking system, such as brakes 122, for example, as well as certain components of the pneumatic supply system are supported on or otherwise operatively associated with one of bogies 104 of rail vehicle 100. For example, supply lines 142 can fluidically interconnect bogies 104 with the pneumatic supply system. Supply lines 142 are shown as being fluidically connected with one or more leveling valves 144 that are operatively connected with gas spring assemblies 120, such as by way of gas lines 146, and are selectively operable to transfer pressurized gas into and out of the gas spring assemblies. In some cases, a pressurized gas storage device or reservoir 148 can, optionally, be fluidically connected along gas line 146 between leveling valve 144 and gas spring assembly 120. Additionally, a cross-flow line 150 can, optionally, be connected in fluid communication between two or more of gas lines 146. In some cases, a control valve 152, such as a duplex check valve, for example, can be fluidically connected along cross-flow line 150, such as is shown in FIG. 2, for example.

Figure 3:
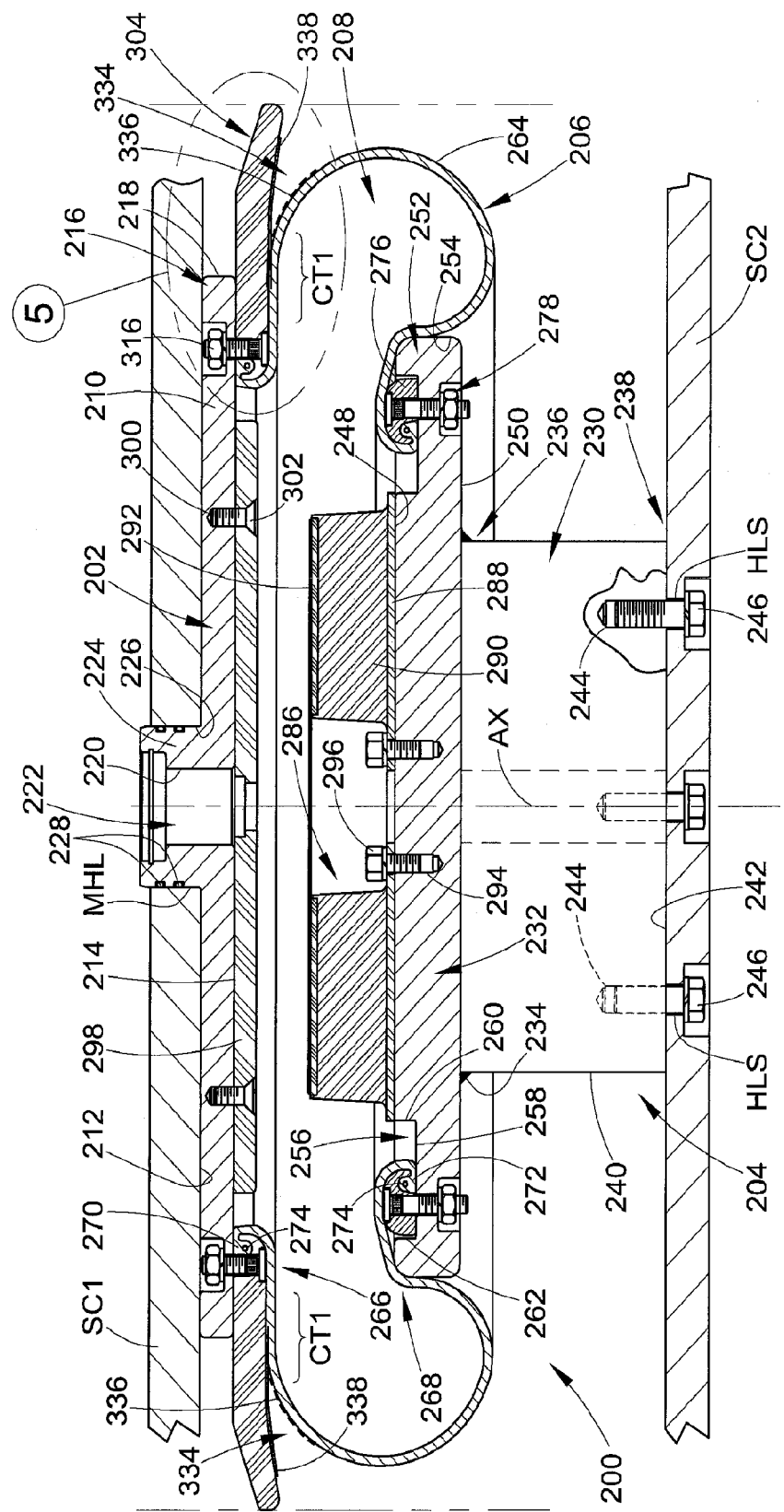
FIG. 3 is a side view, in partial cross-section, of one example of a gas spring assembly including one example of an interface between a flexible wall and a lateral support element in accordance with the subject matter of the present disclosure.
Figure 4:
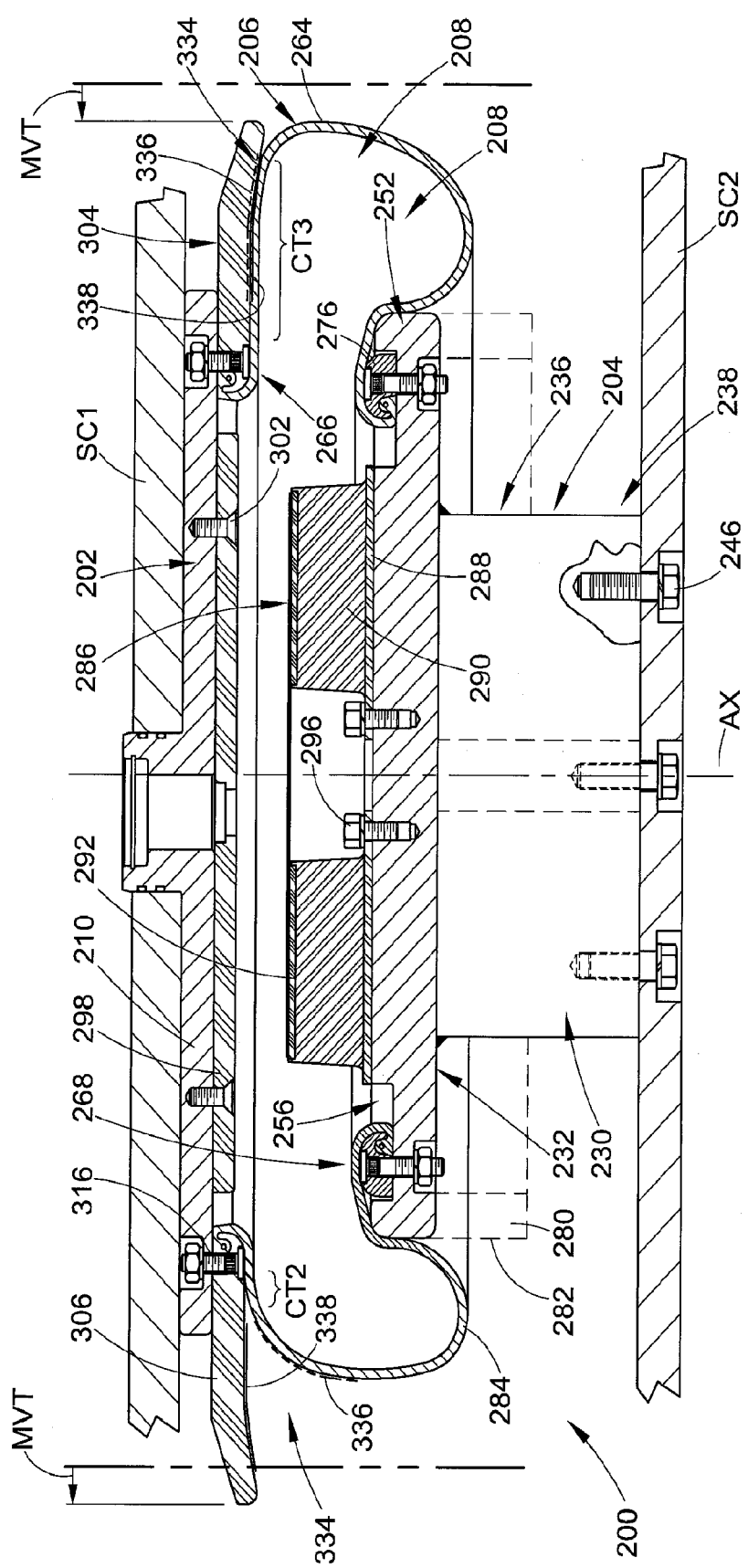
FIG. 4 illustrates the gas spring assembly in FIG. 3 in a laterally displaced condition.
Figure 5:
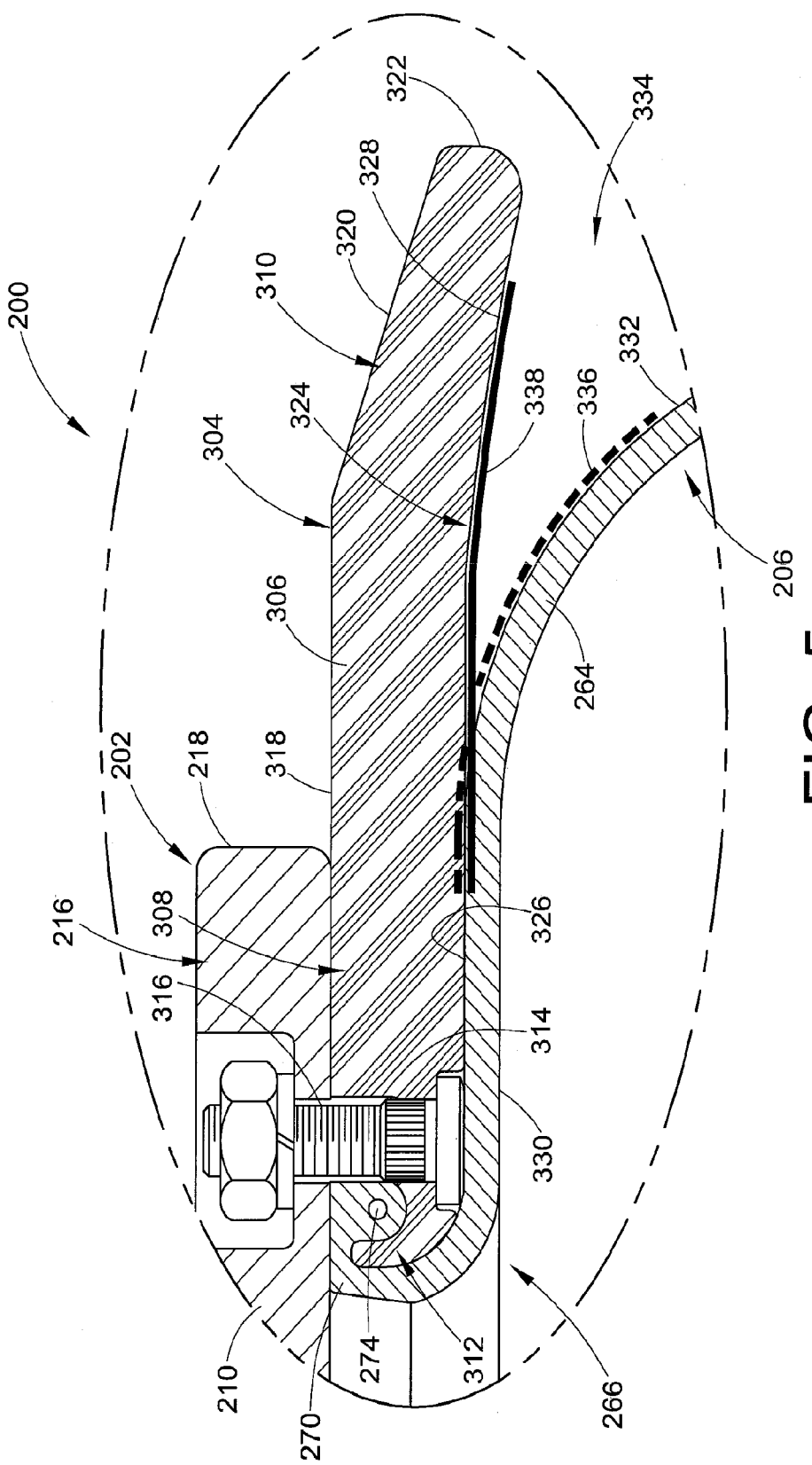
FIG. 5 is an enlarged view of the portion of the gas spring assembly, lateral support element and interface in FIGS. 3 and 4 that is identified as Detail 5 in FIG. 3.

One example of a gas spring assembly in accordance with the subject matter of the present disclosure, such as may be suitable for use as one or more of gas spring assemblies 120 in FIGS. 1 and 2, for example, is shown as gas spring assembly 200 in FIGS. 3-5. The gas spring assembly has a longitudinal axis AX and includes an end member 202, an end member 204 spaced longitudinally from end member 202 and a flexible spring member or sleeve 206 that extends peripherally about the longitudinal axis and is secured between the end members to at least partially define a spring chamber 208.

Gas spring assembly 200 can be disposed between associated sprung and unsprung masses of an associated vehicle in any suitable manner. For example, one end member can be operatively connected to an associated sprung mass with the other end member disposed toward and operatively connected to the associated unsprung mass. In the embodiment shown in FIGS. 3 and 4, for example, end member 202 is secured on or along a structural component SC1, such as an associated vehicle body 102 in FIG. 1, for example, and can be secured thereon in any suitable manner. As another example, end member 204 is secured on or along a structural component SC2, such as an associated rail bogie 104 in FIG. 1, for example, and can be secured thereon in any suitable manner.

In the exemplary arrangement in FIGS. 3 and 4, end member 202 is shown as taking the form of a top plate having a plate wall 210 that has opposing surfaces 212 and 214 such that a plate height (not identified) is at least partially defined therebetween. Plate wall 210 is shown as being generally planar and extending outwardly to an outer periphery 216. In some cases, plate wall 210 can have a generally circular shape such that an outer peripheral surface 218 extending in a heightwise direction can have a generally cylindrical shape. A passage surface 220 at least partially defines a gas transfer passage 222 extending through the end member such that pressurized gas can be transferred into and out of spring chamber 208, such as by way of pneumatic system 124 (FIG. 2) for example. In some cases, the end member can include a projection or boss 224 that extends from along plate wall 210 in a longitudinal direction. In the exemplary arrangement shown in FIGS. 3 and 4, projection 224 extends axially outwardly away from spring chamber 208.

As mentioned above, one or more securement devices (not shown) can be used to secure or otherwise interconnect the end members of the gas spring assembly with corresponding structural components. In some cases, projection 224 can include an outer surface 226 that is dimensioned for receipt within a passage or mounting hole MHL that extends through structural component SC1. Additionally, one or more sealing elements 228 can, optionally, be included that are disposed between or otherwise at least partially form a substantially fluid-tight connection between the end member and the structural component, such as between projection 224 and mounting hole MHL, for example. In some cases, structural component SC1 can, optionally, at least partially define an external reservoir suitable for storing a quantity of pressurized gas.

End member 204 is shown as taking the form of an assembly that includes a support base or pedestal 230 and a base plate 232 that is secured on or along the pedestal in a suitable manner, such as by way of a flowed-material joint 234, for example. Pedestal 230 extends axially between opposing ends 236 and 238, and includes an outer surface 240 that extends peripherally about axis AX and an end surface 242 that is disposed along end 238 and is dimensioned or otherwise configured for operative engagement with an associated structural component, such as structural component SC2, for example. It will be appreciated that end member 204 can be secured on or along the associated structural component in any suitable manner. As one example, pedestal 230 can include a plurality of securement features 244, such as threaded passages that extend inwardly into the pedestal from along end surface 242, for example.

In some cases, a corresponding number of one or more holes or passages HLS can extend through structural component SC2 that are dimensioned for receipt of a securement device 246, such as a threaded fastener, for example. It will be appreciated, however, that other configurations and/or arrangements could alternately be used.

Base plate 232 can have a plate wall (not numbered) that has opposing surfaces 248 and 250 such that a plate height (not identified) is at least partially defined therebetween. Base plate 232 is shown as being generally planar and extending outwardly to an outer periphery 252. In some cases, base plate 232 can have a generally circular shape such that an outer peripheral surface 254 extending in a heightwise direction can have a generally cylindrical shape. Additionally, in some cases, base plate 232 can, optionally, include an endless annular recess or groove 256 that extends axially inwardly into the base plate from along surface 248 thereof. It will be appreciated that such a groove, if provided, can be of any suitable size, shape, configuration and/or arrangement. For example, groove 256 is shown as being at least partially defined by a bottom surface 258, an inner side surface 260 and an outer side surface 262. In a preferred arrangement, groove 256 can be dimensioned to at least partially receive a portion of flexible spring member 206 and one or more retaining elements, such as may be used to secure the flexible spring member on or along the base plate, for example.

Flexible spring member 206 can be of any suitable size, shape, construction and/or configuration. As one example, flexible spring member 206 can include a flexible wall 264 that is at least partially formed from one or more layers or plies (not identified) of elastomeric material (e.g., natural rubber, synthetic rubber and/or thermoplastic elastomer) and can optionally include one or more plies or layers of filament reinforcing material (not shown). Flexible wall 264 is shown extending in a longitudinal direction between opposing ends 266 and 268. In some cases, flexible wall 264 can, optionally, include a mounting bead dispose along either one or both of ends 266 and 268. In the arrangement shown in FIGS. 3 and 4, mounting beads 270 and 272 are shown as being respectively disposed along ends 266 and 268. In some cases, the mounting beads can, optionally, include a reinforcing element, such as an endless, annular bead core 274, for example.

It will be appreciated, that the ends of flexible spring member 206 can be secured on, along or otherwise interconnected between end members 202 and 204 in any suitable manner. As one example, gas spring assembly 200 can include one or more bead retaining elements that engage at least a portion of the flexible spring member and maintain the flexible spring member in substantially fluid-tight engagement with the corresponding end member (e.g., end member 204). In the arrangement shown in FIGS. 3 and 4, end 268 of flexible wall 264 is disposed in abutting engagement with bottom surface 258 of groove 256 in base plate 232. A bead retaining element 276, such as in the form of an endless, annular ring, for example, captures at least a portion of mounting bead 272 and is shown as being secured on or along base plate 232 by way of a plurality of securement devices 278, such as, for example, threaded fastener (not numbered) and threaded nut (not numbered) combinations that extend through at least approximately aligned holes or slots (not numbered) in the base plate and in the bead retaining element.

Typically, at least a portion of flexible spring member 206 will extend radially outward beyond outer periphery 252 of base plate 232. In some cases, end member 204 can include an outer support wall 280 (FIG. 4) that can, optionally, extend peripherally around or otherwise along base plate 232, such as from along the plate wall of the base plate and in a direction toward end 240 of pedestal 230. In such cases, flexible spring member 206 can extend along an outer surface 282 (FIG. 4) of outer support wall 280 such that a rolling lobe 284 is formed along the flexible spring member. Outer surface 282 is shown in FIG. 4 as having a generally cylindrical shape, and rolling lobe 284 can be displaceable along the outer surface as the gas spring assembly is axially displaced between extended and compressed conditions, such as may occur during dynamic use in operation. It will be appreciated that other shapes and/or configurations of outer support wall 280 and/or outer surface 282 can alternately be used, such as may be useful to provide desired performance characteristics, for example.

As is well known in the art, it is generally desirable to avoid or at least minimize contact between end members of a gas spring assembly, such as may occur due to variations in load conditions and/or upon deflation of the gas spring assembly, for example. As such, gas spring assembly 200 is shown in FIGS. 3 and 4 as including a jounce bumper 286 (FIG. 4) that is disposed within spring chamber 208 and supported on end member 204. As identified in FIG. 4, jounce bumper 286 is shown as including a mounting plate 288 that is disposed in abutting engagement with end member 204, a bumper body 290 supported on the mounting plate, and a wear plate 292 that is supported on at least partially embedded within bumper body 290.

It will be appreciated that jounce bumper 286 can be secured on or along an end member in any suitable manner. As identified in FIG. 4, for example, base plate 232 of end member 204 is shown as including one or more securement features 294, such as may take the form of a plurality of threaded holes, for example. In such case, a corresponding number of one or more securement devices 296, such as one or more threaded fasteners, for example, can extend through one of a corresponding number of holes, openings or other features of the jounce bumper or a component thereof (e.g., mounting plate 288) to secure the jounce bumper on or along the end member.

Gas spring assembly 200 can also, optionally, include a complimentary component that may be dimensioned to or otherwise suitable for abuttingly engaging the jounce bumper or a component thereof (e.g., wear plate 292). In the arrangement shown in FIGS. 3 and 4, gas spring assembly 200 includes a bearing plate 298 that is disposed in abutting engagement along surface 214 of plate wall 210 and is secured on or along end member 202. It will be appreciated that the bearing plate can be attached to the end member in any suitable manner. For example, plate wall 210 of end member 202 can include one or more securement features 300, such as threaded holes, for example, that as may be suitable for receiving a complimentary securement device 302, such as a threaded fastener, for example, to secure the bearing plate on or along the end member.

As discussed above, it will be appreciated, that the ends of flexible spring member 206 can be secured on, along or otherwise interconnected between end members 202 and 204 in any suitable manner. As mentioned above, for example, gas spring assembly 200 can include one or more bead retaining elements that engage at least a portion of the flexible spring member and maintain the flexible spring member in substantially fluid-tight engagement with the corresponding end member (e.g., end member 202). In some cases, a bead retaining element, such as bead retaining element 276, for example, could be used. Alternately, one or more bead retaining features can be formed on or along another component of the gas spring assembly. For example, in the arrangement shown in FIGS. 3-5, gas spring assembly 200 includes a lateral support element 304 in accordance with the subject matter of the present disclosure that is configured to engage a portion of flexible spring member 206 during lateral movement of end member 202 relative to end member 204. Additionally, lateral support element 304 can, optionally, be adapted or otherwise configured to secured or otherwise support an end of a flexible wall, such as end 266, for example, on or along an end member, such as end member 202, for example.

As identified in FIG. 5, lateral support element 304 includes an element wall 306 in the form of an endless, annular ring that extends radially between an inward or mounting portion 308 and an outward or support portion 310. As illustrated in the cross-sectional profile shown in FIG. 5, element wall 306 includes a bead-retaining wall portion 312 that extends in a radially-inward direction from along mounting portion 308. In some cases, bead-retaining wall portion 312 can have a somewhat hook-shaped cross-sectional profile and can, in some cases, form an innermost radial extent of the lateral support element. In a preferred arrangement, bead-retaining wall portion 312 can retain end 266 of flexible wall 264 in abutting engagement with surface 214 of plate wall 210.

Additionally, it will be appreciated that lateral support element 304 can be secured on or along end member 202 in any suitable manner. As one example, lateral support element 304 can include a plurality of holes or openings 314 extending therethrough that are disposed in spaced relation to one another about element wall 306, such as in peripherally-spaced relation to one another along mounting portion 308 thereof, for example. In such case, plate wall 210 of end member 202 can include a corresponding plurality of holes or openings HLS (FIG. 4) that, together with holes 314, are dimensioned to receive one of a plurality of securement devices 316, such as threaded fastener and threaded nut assemblies, for example. In this manner, lateral support element 304 can be secured on end member 202, and flexible spring member 206 can be operatively secured to the end member such that a substantially fluid-tight seal can be formed therebetween.

With further reference to FIG. 5, element wall 306 of lateral support element 304 is shown as including a mounting surface 318 that is dimensioned or otherwise configured to abuttingly engage an associated component or structural feature, such as plate wall 210 of end member 202, for example. Element wall 306 also includes an outer surface 320 along support portion 310 that can have any suitable shape and/or configuration, such as a frustoconical shape, for example. Element wall 306 can include an outer peripheral wall portion 322 that, in some cases, can at least partially define an outermost peripheral extent of lateral support element 304. The element wall (e.g., element wall 306) of a lateral support element, such as lateral support element 304, for example, can further include a support surface having a cross-sectional profile suitable for operatively engaging and at least partially supporting, either directly or indirectly, the flexible wall of the gas spring assembly during lateral (i.e., transverse) movement of the end members relative to one another.

As identified in FIG. 5, element wall 306 of lateral support element 304 includes a support surface 324 that is shown as facing in a direction generally opposite mounting surface 318 and/or outer surface 320. In a preferred arrangement, element wall 306 is positioned such that at least a portion of support surface 324 can abuttingly engage a portion of flexible spring member 206 during lateral (i.e., transverse) movement of end member 202 relative to end member 204. It will be appreciated that lateral support elements having support surfaces with cross-sectional profiles of a variety of shapes, sizes and configurations have been developed and are commonly used, such as may be suitable for contributing to certain lateral performance characteristics of a gas spring assembly, for example. As such, it will be appreciated that a support surface having a cross-sectional profile of any suitable size, shape and/or configuration could be used.

In the arrangement shown in FIGS. 3-5, support surface 324 is shown as including a surface profile portion 326 that extends transverse to axis AX and in approximate alignment with mounting surface such that an annularly-extending, approximately planar area is formed along a radially-inward portion of support surface 324. Support surface 324 is also shown as including a surface profile portion 328 that extends radially outward from along surface profile portion 326 at an angle (not numbered) relative to surface profile portion 326 such that a frustoconically-shaped area is formed along a radially-outward portion of the support surface. In some cases, the approximately planar, annular area that is at least partially defined by surface profile portion 326 can correspond to a relatively constant lateral stiffness of the gas spring assembly, such as may occur during relative lateral deflection of the end members in which at least a portion of flexible spring member 206 contacts or otherwise abuttingly engages a portion of the approximately planar area. And, in some cases, a forward or positive taper area can be at least partially defined by surface profile portion 328 and can, in some cases, provide for increased lateral stiffness of the gas spring assembly, such as may occur during lateral deflection of the end members relative to one another under which at least a portion of flexible spring member 206 contacts or otherwise abuttingly engages a portion of the forward or positive taper area.

It will be appreciated that end members 202 and 204 are shown in FIG. 3 in an approximately coaxial or aligned condition, and are shown in FIG. 4 as being moved in a lateral direction into an offset or laterally-shifted condition, such as is represented in FIG. 4 by reference arrows MVT. Flexible spring member 206 is shown as having an inside surface 330 that at least partially defines spring chamber 208 and an outside surface 332. It will be appreciated that under typical conditions of use, at least a portion of outside surface 332 of flexible spring member 206 may be disposed on or along at least a portion of support surface 324 of lateral support element 304. For example, under conditions in which end members 202 and 204 are disposed toward a centered, coaxial or otherwise at least approximately aligned condition, such as is shown in FIG. 3, for example, an approximately uniform annular area of support surface 324 can abuttingly engage a corresponding area of outside surface 332 of flexible spring member 206. Such an approximately uniform annular area is shown in FIG. 3 in the form of approximately equal cross-sectional areas of contact CT1 on diametrically opposing sides of the support surface.

As end members 202 and 204 are laterally displaced relative to one another toward an offset or laterally-shifted condition, flexible spring member 206 will separate from support surface 324 along or otherwise around a first circumferential portion of lateral support element 304, such as is shown and represented in FIG. 4 by cross-sectional area of contact CT2. Additionally, as end members 202 and 204 are laterally displaced relative to one another toward an offset or laterally-shifted condition, flexible spring member 206 will come into increased contact with support surface 324 along or otherwise around a second, different circumferential portion of lateral support wall 304, such as is shown and identified in FIG. 4 by cross-sectional area of contact CT3, which is illustrated as being greater than cross-sectional area of contact CT2. In many cases, the first and second circumferential portions of support surface 324 and/or lateral support wall 304 will be disposed generally opposite one another.

With further reference to FIGS. 3-5, a gas spring assembly in accordance with the subject matter of the present disclosure, such as gas spring assembly 200, for example, can also include an interface between the outside surface of the flexible wall of the gas spring assembly (e.g., outside surface 332 of flexible wall 264 of flexible spring member 206) and a surface of the lateral support element of the gas spring assembly (e.g., support surface 324 of lateral support element 304) that has reduced-frictional properties and/or characteristics (i.e., a reduced-friction interface) in comparison with conventional constructions. In some cases, one or more elements, components and/or materials could be disposed on, along or otherwise between the flexible spring member and a surface of the lateral support element. For example, gas spring assembly 200 can include an interface 334 that extends annularly about axis AX between support surface 324 of lateral support element 304 and outside surface 332 of flexible wall 264, and that is at least partially formed by a quantity of material that is deposited or otherwise applied along the outer surface of the flexible wall, such as is represented in FIGS. 3-5 by dashed line 336. Additionally, or in the alternative, interface 334 can be at least partially formed by a quantity of material could be deposited or otherwise applied along at least a portion of support surface 324 of lateral support element 304, such as is represented in FIGS. 3-5 by solid line 338.

It will be appreciated that the quantity of material represented by lines 336 and 338 can be in any suitable form and/or of any suitable consistency, and can include compounds and/or compositions of any suitable type and/or kind. For example (and without being limiting), in some cases, quantity of material 336 and/or 338 could take the form of a liquid, semi-solid or solid lubricant or other friction-reducing compound, such as a grease, for example. In such case, the material(s) could be in form of a layer that extends approximately uniformly about axis AX, such as in a continuous, annular manner or in a discontinuous or otherwise segmented configuration. Additionally, or in the alternative, quantity of material 336 and/or 338 could take the form of a surface treatment of at least a portion of the element wall and/or the outer surface of the flexible wall. In some cases, the surface treatment can include coating of a low-friction material that is affixed to at least a portion of the support surface and/or the outer surface of the flexible wall. Such a manner of forming a friction-reduced interface (e.g., interface 334) may, in some cases, minimize or at least reduce issues that may arise in connection with the migration of and/or adhesion of foreign materials to layers of liquid, semi-solid and, in some cases, solid lubricants. Examples of friction-reducing materials can include polymeric coatings, such as PTFE based resins, and/or nearly frictionless carbon (NFC) coatings, for example. In some cases, the quantity of material (e.g., quantity of material 336 and/or 338) can be formed from any material or combination of materials capable of generating or otherwise forming a comparatively reduced coefficient of friction between the material of the flexible wall (e.g., flexible wall 264) and the material of the element wall (e.g., element wall 344) relative to an un-treated interface therebetween.

Figure 6:
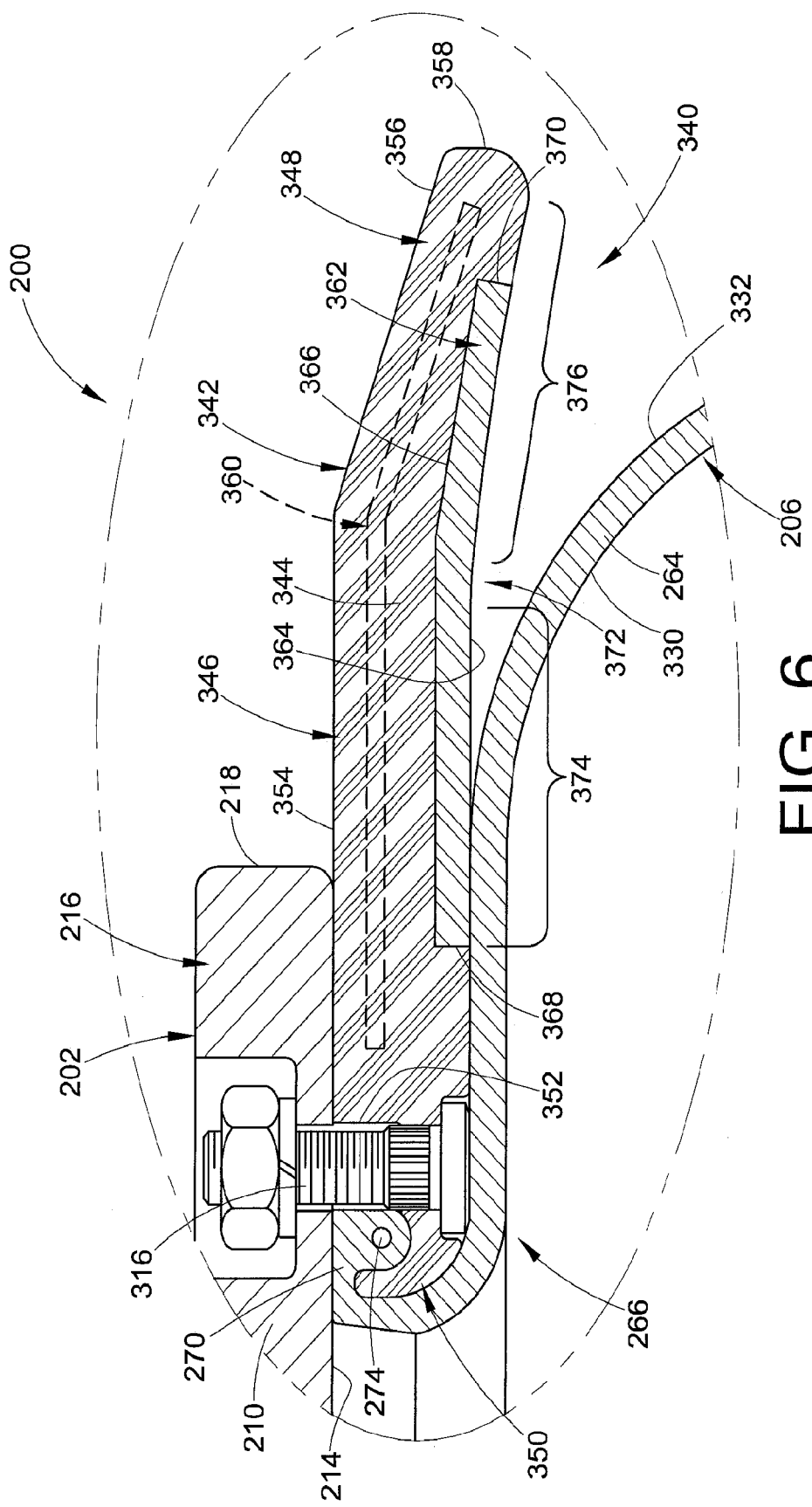
FIG. 6 is an enlarged view of the portion of the gas spring assembly in FIGS. 3 and 4 that is identified as Detail 5 in FIG. 3 illustrating another example of an interface between a flexible wall and lateral support element in accordance with the subject matter of the present disclosure.

An alternate embodiment of an interface 340 in accordance with the subject matter of the present disclosure is illustrated in FIG. 6 in which lateral support element 304 of FIGS. 3-5 has been replaced with a lateral support element 342, which has an alternate construction to that of lateral support element 304. It will be appreciated that, though not shown in FIG. 6, quantities of material 336 and/or 338 can, optionally, be used together with lateral support element 342 to form an interface having reduced-frictional properties and/or characteristics (i.e., a reduced-friction interface) in comparison with conventional constructions. As shown in FIG. 6, however, interface 340 is shown as being formed between lateral support element 342 and flexible wall 206 of gas spring assembly 200.

As illustrated in the cross-sectional profile in FIG. 6, lateral support element 342 includes an element wall 344 in the form of an endless, annular ring that extends radially between an inward or mounting portion 346 and an outward or support portion 348. Element wall 344 also includes a bead-retaining wall portion 350 that extends in a radially-inward direction from along mounting portion 346. In some cases, bead-retaining wall portion 350 can have a somewhat hook-shaped cross-sectional profile and can, in some cases, form an innermost radial extent of the lateral support element. In a preferred arrangement, bead-retaining wall portion 350 can retain at least a portion of end 266 of flexible wall 264 (e.g., mounting bead 270) in abutting engagement with surface 214 of plate wall 210.

Additionally, it will be appreciated that lateral support element 342 can be secured on or along end member 202 in any suitable manner. As one example, lateral support element 342 can include a plurality of holes or openings 352 (only one of which is shown in FIG. 6) extending therethrough that are disposed in spaced relation to one another about element wall 344, such as in peripherally-spaced relation to one another along mounting portion 346 thereof, for example. In such case, plate wall 210 of end member 202 can include a corresponding plurality of holes or openings HLS (FIG. 4) that, together with holes 352, are dimensioned to receive securement devices 316, such as threaded fastener and threaded nut assemblies, for example. In this manner, lateral support element 342 can be secured on end member 202, and flexible spring member 206 can be operatively secured to the end member such that a substantially fluid-tight seal can be formed therebetween.

With further reference to FIG. 6, element wall 344 of lateral support element 342 is shown as including a mounting surface 354 that is dimensioned or otherwise configured to abuttingly engage an associated component or structural feature, such as plate wall 210 of end member 202, for example. Element wall 344 also includes an outer surface 356 along support portion 348 that can have any suitable shape and/or configuration, such as a frustoconical shape, for example. Element wall 344 can include an outer peripheral wall portion 358 that, in some cases, can at least partially define an outermost peripheral extent of lateral support element 342. The element wall (e.g., element wall 344) of a lateral support element, such as lateral support element 342, for example, can further include a support surface having a cross-sectional profile suitable for operatively engaging and at least partially supporting, either directly or indirectly, the flexible spring member of the gas spring assembly during lateral (i.e., transverse) movement of the end members relative to one another.

It will be appreciated that a lateral support element in accordance with the subject matter of the present disclosure (e.g., lateral support element 304 and/or 342) can include any suitable combination of one or more components and/or elements, which can be formed from any suitable material or combination of materials. As one example, the element wall of the lateral support element could be primarily formed from a reduced-friction material, such as a rigid or semi-rigid thermoplastic material (e.g., polyethylene, polypropylene and/or polyamide). In some cases, the lateral support element can, optionally, include one or more reinforcing elements or structures, such as could be disposed on, along or at least partially embedded within the element wall thereof, such as may be useful for providing increased axial rigidity and/or structural integrity of the lateral support element which may be beneficial for minimizing or at least reducing axial deflection of the element wall during use in operation. One example of a reinforcing element or structure 360 is shown in FIG. 6 as being substantially entirely embedded within element wall 344, can be formed as a comparatively thin-walled component that is formed from a comparatively rigid material, such as a reinforced thermoplastic (e.g., glass-filled polyamide) or a metal material (e.g., steel), for example.

As another example, the element wall of the lateral support element could be primarily formed from a substantially rigid material, such as a metal material (e.g., steel or aluminum) or a reinforced or high-strength thermoplastic (e.g., glass-filled polyamide). Alternately, a somewhat less rigid material could be used together with a reinforcing element or structure, such as reinforcing structure 360, for example. Additionally, a lateral support element in accordance with the subject matter of the present disclosure can, optionally, include one or more friction-reducing wall section that are at least partially embedded or otherwise disposed along one or more surfaces of the element wall. As illustrated in FIG. 6, element wall 344 of lateral support element 342 can, optionally, include a reduced-friction wall section 362, such as in the form of an annular insert, for example, that is at least partially embedded within element wall 344. In the arrangement shown, reduced-friction wall section 362 includes opposing sides 364 and 366 that extend radially between opposing edges 368 and 370. It will be appreciated, however, that other configurations and/or arrangements could alternately be used. Reduced-friction wall section 362 can be supported or otherwise retained on or along element wall 344 in any suitable manner, such as by way of one or more mechanical fasteners (e.g., threaded fasteners), one or more flowed-material joints (e.g., adhesive and/or welded connections) and/or by co-molding or overmolding the element wall and the reduced-friction wall section together, for example.

Additionally, it will be appreciated that reduced-friction wall section 362 can be formed from any suitable material or combination of materials having a comparatively reduced coefficient of friction relative to the material of element wall 344. Examples of such materials can include polymeric materials, such as ultra-high molecular weight polyethylene and PTFE-based resins, for example, and nearly frictionless carbon (NFC) coatings disposed along a substrate or base material (e.g., a metal or ceramic material), for example. It will be appreciated, however, that other materials and/or combinations of materials can be used without departing from the subject matter of the present disclosure.

As identified in FIG. 6, element wall 344 of lateral support element 342 includes a support surface 372 that is shown as facing in a direction generally opposite mounting surface 354 and/or outer surface 356. In a preferred arrangement, element wall 344 is positioned such that at least a portion of support surface 372 can abuttingly engage a portion of flexible spring member 206 during lateral (i.e., transverse) movement of end member 202 relative to end member 204. It will be appreciated that lateral support elements having support surfaces with cross-sectional profiles of a variety of shapes, sizes and configurations have been developed and are commonly used, such as may be suitable for contributing to certain lateral performance characteristics of a gas spring assembly, for example. As such, it will be appreciated that a support surface having a cross-sectional profile of any suitable size, shape and/or configuration could be used.

In the arrangement shown in FIG. 6, support surface 372 is shown as including a surface profile portion 374 that extends transverse to axis AX and in approximate alignment with mounting surface such that an annularly-extending, approximately planar area is formed along a radially-inward portion of support surface 372. Support surface 372 is also shown as including a surface profile portion 376 that extends radially outwardly from along surface profile portion 374 at an angle (not numbered) relative to surface profile portion 364 such that a frustoconically-shaped area is formed along a radially-outward portion of the support surface. In some cases, the approximately planar, annular area that is at least partially defined by surface profile portion 374 can correspond to a relatively constant lateral stiffness of the gas spring assembly, such as may occur during relative lateral deflection of the end members in which at least a portion of flexible wall 206 contacts or otherwise abuttingly engages a portion of the approximately planar area. And, in some cases, a forward or positive taper area can be at least partially defined by surface profile portion 376 and can, in some cases, provide for increased lateral stiffness of the gas spring assembly, such as may occur during lateral deflection of the end members relative to one another under which at least a portion of flexible wall 206 contacts or otherwise abuttingly engages a portion of the forward or positive taper area.

It will be recognized from FIG. 6 that surface profile portion 374 can, in some cases, be at least partially from side or surface 364 of reduced-friction wall section 362. Additionally, or in the alternative, it will be recognized that surface profile portion 376 can, in some cases, be at least partially formed from side or surface 364 of reduced-friction wall section 362. It will be appreciated, however, that other configurations and/or arrangements could alternately be used.

Generally, a gas spring assembly in accordance with the subject matter of the present disclosure can include a friction-reducing member, either as a part of the lateral support element (i.e., bead skirt) or between the lateral support element and the flexible spring member, to provide a surface on which the flexible wall can slide without significant wear. In some cases, the angle of the bearing surface of the lateral support element may be reduced relative to the plane of the end member (e.g., bead plate) to further reduce friction. As a result, a gas spring assembly in accordance with the subject matter of the present disclosure can allow a certain amount of lateral movement while reducing friction and wear on the flexible spring member, which may, in some cases, minimize or at least reduce the possibility of performance degradation of the flexible wall in addition to reducing the lateral spring rate of the gas spring assembly. As discussed above, the friction-reducing member can be an integral part of the bottom, sleeve-facing surface of the lateral support element, such that the friction-reducing member may be formed with the bead skirt as a single unit. Alternatively, as discussed above, the friction-reducing member may be a component formed separate from the bead skirt and position between the sleeve-facing surface of the bead skirt and the flexible spring member. The friction-reducing member may be formed from any low friction material, such as sintered/porous metal inundated with lubricant, thermoplastics (e.g., UHMW polyethylene, PTFE based resins, Teflon®, and nearly frictionless carbon (NFC) coatings and/or films, such as may be applied on or along substrates formed from steel, aluminum and/or titanium alloys, glass, ceramics and/or hard, high-temperature plastics, for example.

Figure 7:
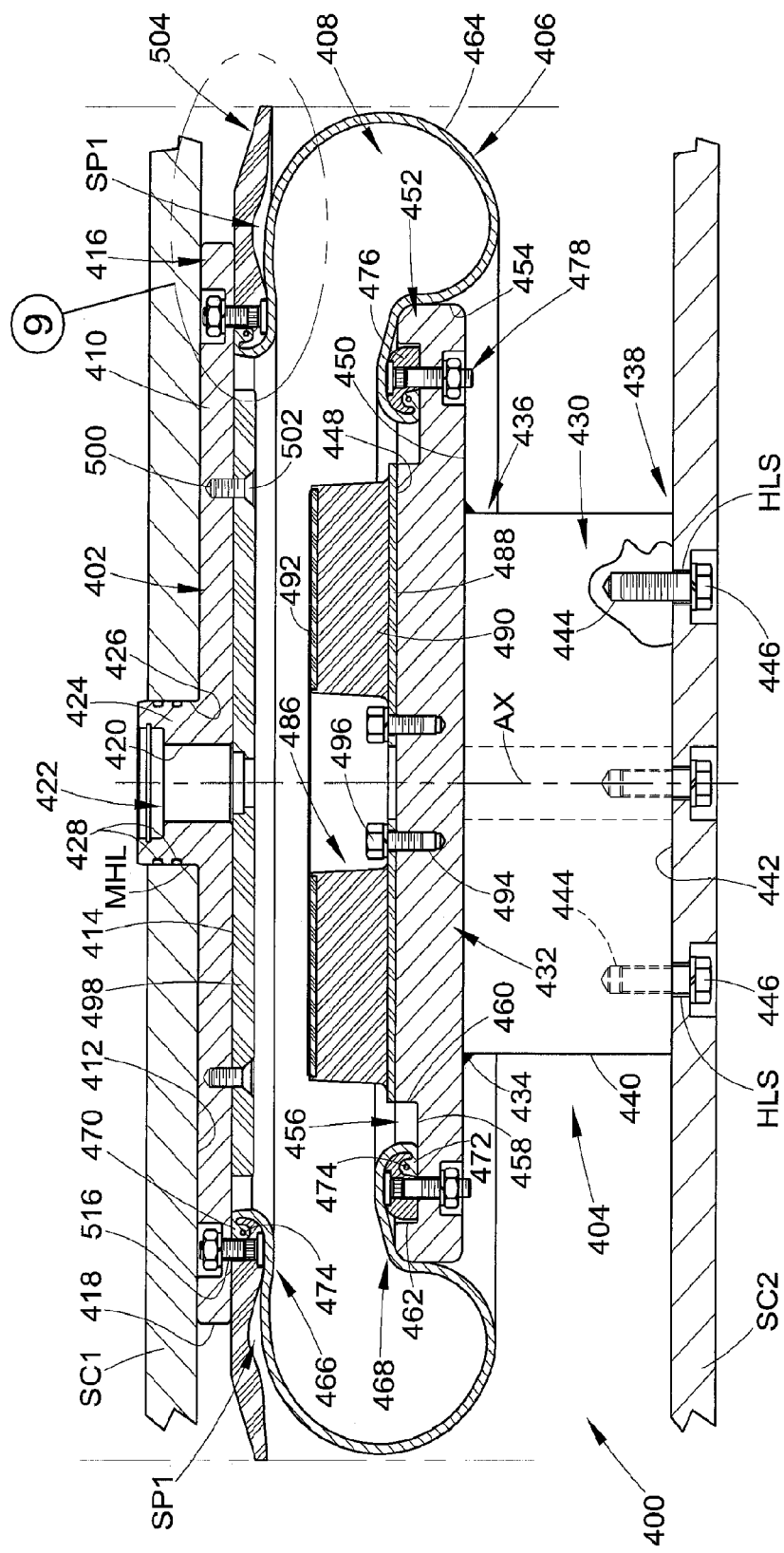
FIG. 7 is a side view, in partial cross-section, of still another example of a gas spring assembly including an example of an interface between a flexible wall and lateral support element in accordance with the subject matter of the present disclosure.
Figure 8:
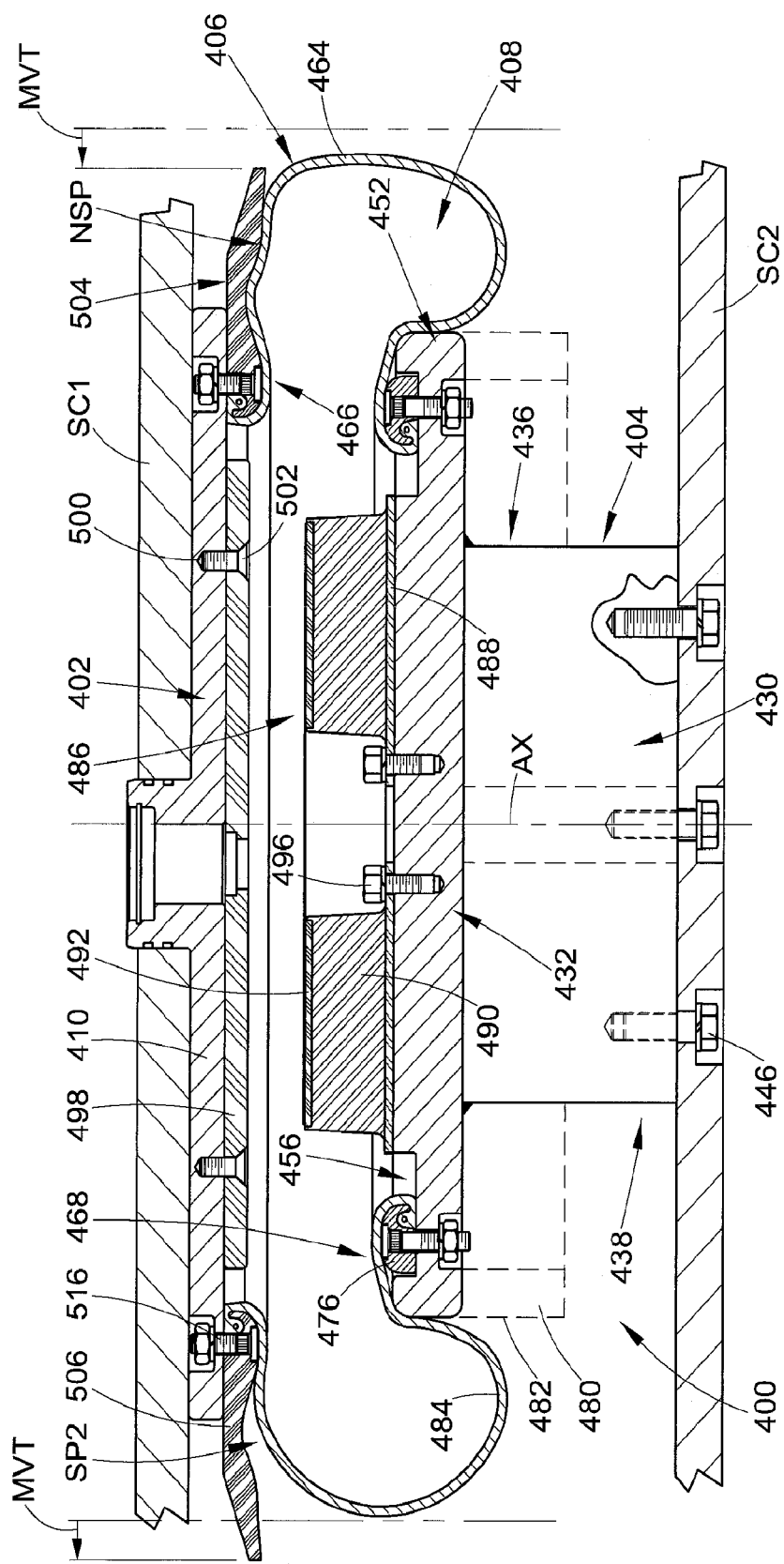
FIG. 8 illustrates the gas spring assembly in FIG. 7 in a laterally displaced condition.
Figure 9:
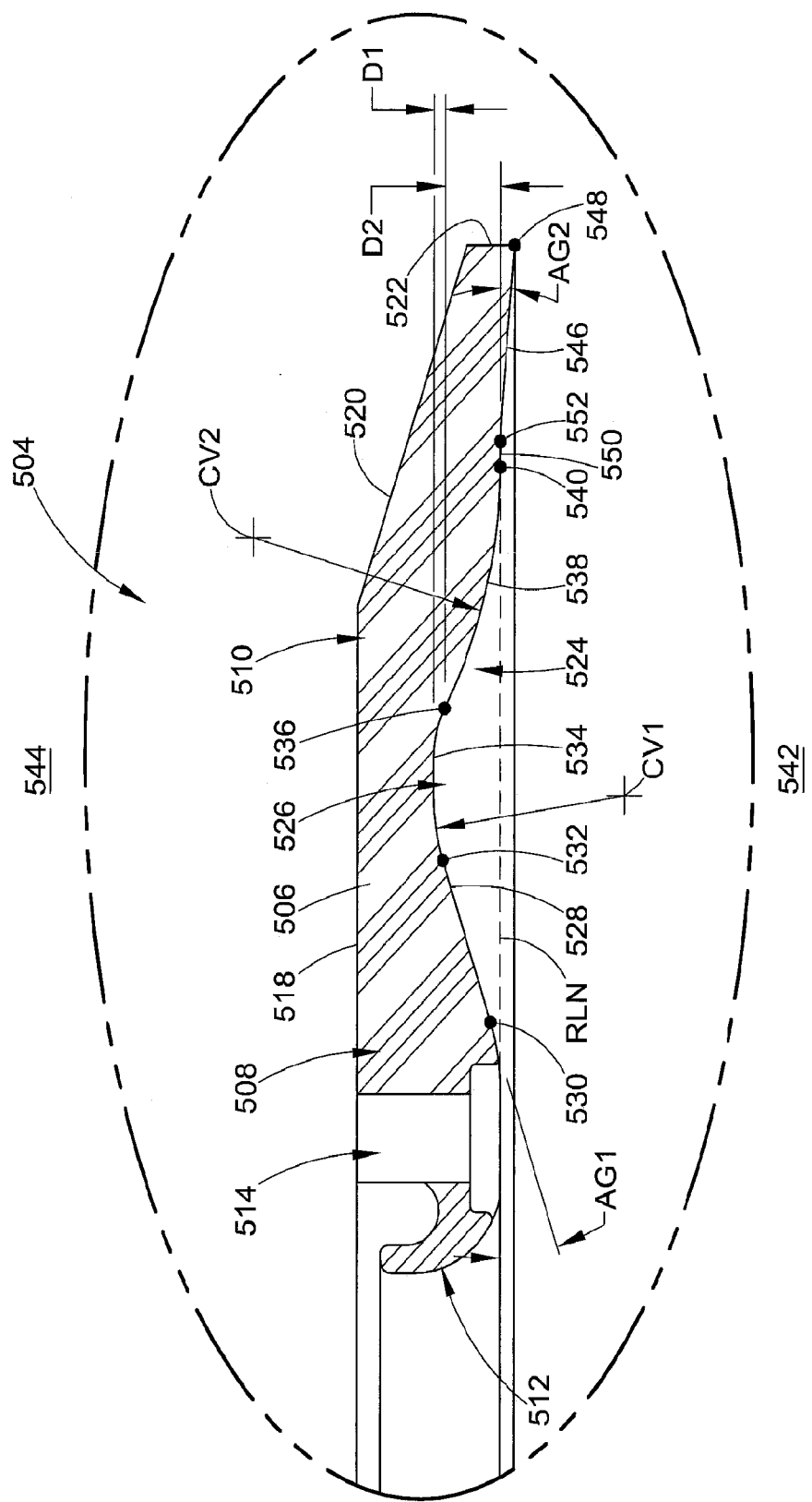
FIG. 9 is an enlarged view of the portion of the gas spring assembly, lateral support element and interface in FIGS. 7 and 8 that is identified as Detail 9 in FIG. 7.

Another example of a gas spring assembly in accordance with the subject matter of the present disclosure, such as may be suitable for use as one or more of gas spring assemblies 120 in FIGS. 1 and 2, for example, is shown as gas spring assembly 400 in FIGS. 7-9. The gas spring assembly has a longitudinal axis AX and includes an end member 402, an end member 404 spaced longitudinally from end member 402 and a flexible spring member or sleeve 406 that extends peripherally about the longitudinal axis and is secured between the end members to at least partially define a spring chamber 408.

Gas spring assembly 400 can be disposed between associated sprung and unsprung masses of an associated vehicle in any suitable manner. For example, one end member can be operatively connected to an associated sprung mass with the other end member disposed toward and operatively connected to the associated unsprung mass. In the embodiment shown in FIGS. 7 and 8, for example, end member 402 is secured on or along structural component SC1, such as an associated vehicle body 102 in FIG. 1, for example, and can be secured thereon in any suitable manner. As another example, end member 404 is secured on or along structural component SC2, such as an associated rail bogie 104 in FIG. 1, for example, and can be secured thereon in any suitable manner.

In the exemplary arrangement in FIGS. 7 and 8, end member 402 is shown as taking the form of a top plate having a plate wall 410 that has opposing surfaces 412 and 414 such that a plate height (not identified) is at least partially defined therebetween. Plate wall 410 is shown as being generally planar and extending outwardly to an outer periphery 416. In some cases, plate wall 410 can have a generally circular shape such that an outer peripheral surface 418 extending in a heightwise direction can have a generally cylindrical shape. A passage surface 420 at least partially defines a gas transfer passage 422 extending through the end member such that pressurized gas can be transferred into and out of spring chamber 408, such as by way of pneumatic system 124 (FIG. 2) for example. In some cases, the end member can include a projection or boss 424 that extends from along plate wall 410 in a longitudinal direction. In the exemplary arrangement shown in FIGS. 7 and 8, projection 424 extends axially outwardly away from spring chamber 408.

As mentioned above, one or more securement devices (not shown) can be used to secure or otherwise interconnect the end members of the gas spring assembly with corresponding structural components. In some cases, projection 424 can include an outer surface 426 that is dimensioned for receipt within a passage or mounting hole MHL that extends through structural component SC1. Additionally, one or more sealing elements 428 can, optionally, be included that are disposed between or otherwise at least partially form a substantially fluid-tight connection between the end member and the structural component, such as between projection 424 and mounting hole MHL, for example. In some cases, structural component SC1 can, optionally, at least partially define an external reservoir suitable for storing a quantity of pressurized gas.

End member 404 is shown as taking the form of an assembly that includes a support base or pedestal 430 and a base plate 432 that is secured on or along the pedestal in a suitable manner, such as by way of a flowed-material joint 434, for example. Pedestal 430 extends axially between opposing ends 436 and 438, and includes an outer surface 440 that extends peripherally about axis AX and an end surface 442 that is disposed along end 438 and is dimensioned or otherwise configured for operative engagement with an associated structural component, such as structural component SC2, for example. It will be appreciated that end member 404 can be secured on or along the associated structural component in any suitable manner. As one example, pedestal 430 can include a plurality of securement features 444, such as threaded passages that extend inwardly into the pedestal from along end surface 442, for example. In some cases, a corresponding number of one or more holes or passages HLS can extend through structural component SC2 that are dimensioned for receipt of a securement device 446, such as a threaded fastener, for example. It will be appreciated, however, that other configurations and/or arrangements could alternately be used.

Base plate 432 can have a plate wall (not numbered) that has opposing surfaces 448 and 450 such that a plate height (not identified) is at least partially defined therebetween. Base plate 432 is shown as being generally planar and extending outwardly to an outer periphery 452. In some cases, base plate 432 can have a generally circular shape such that an outer peripheral surface 454 extending in a heightwise direction can have a generally cylindrical shape. Additionally, in some cases, base plate 432 can, optionally, include an endless annular recess or groove 456 that extends axially inwardly into the base plate from along surface 448 thereof. It will be appreciated that such a groove, if provided, can be of any suitable size, shape, configuration and/or arrangement. For example, groove 456 is shown as being at least partially defined by a bottom surface 458, an inner side surface 460 and an outer side surface 462. In a preferred arrangement, groove 456 can be dimensioned to at least partially receive a portion of flexible spring member 406 and one or more retaining elements, such as may be used to secure the flexible spring member on or along the base plate, for example.

Flexible spring member 406 can be of any suitable size, shape, construction and/or configuration. As one example, flexible spring member 406 can include a flexible wall 464 that is at least partially formed from one or more layers or plies (not identified) of elastomeric material (e.g., natural rubber, synthetic rubber and/or thermoplastic elastomer) and can optionally include one or more plies or layers of filament reinforcing material (not shown). Flexible wall 464 is shown extending in a longitudinal direction between opposing ends 466 and 468. In some cases, flexible wall 464 can, optionally, include a mounting bead dispose along either one or both of ends 466 and 468. In the arrangement shown in FIGS. 7 and 8, mounting beads 470 and 472 are shown as being respectively disposed along ends 466 and 468. In some cases, the mounting beads can, optionally, include a reinforcing element, such as an endless, annular bead core 474, for example.

It will be appreciated, that the ends of flexible spring member 406 can be secured on, along or otherwise interconnected between end members 402 and 404 in any suitable manner. As one example, gas spring assembly 400 can include one or more bead retaining elements that engage at least a portion of the flexible spring member and maintain the flexible spring member in substantially fluid-tight engagement with the corresponding end member (e.g., end member 404). In the arrangement shown in FIGS. 7 and 8, end 468 of flexible wall 464 is disposed in abutting engagement with bottom surface 458 of groove 456 in base plate 432. A bead retaining element 476, such as in the form of an endless, annular ring, for example, captures at least a portion of mounting bead 472 and is shown as being secured on or along base plate 432 by way of a plurality of securement devices 478, such as, for example, threaded fastener (not numbered) and threaded nut (not numbered) combinations that extend through at least approximately aligned holes or slots (not numbered) in the base plate and in the bead retaining element.

Typically, at least a portion of flexible spring member 406 will extend radially outward beyond outer periphery 452 of base plate 432. In some cases, end member 404 can include an outer support wall 480 (FIG. 8) that can, optionally, extend peripherally around or otherwise along base plate 432, such as from along the plate wall of the base plate and in a direction toward end 440 of pedestal 430. In such cases, flexible spring member 406 can extend along an outer surface 482 (FIG. 8) of outer support wall 480 such that a rolling lobe 484 is formed along the flexible spring member. Outer surface 482 is shown in FIG. 8 as having a generally cylindrical shape, and rolling lobe 484 can be displaceable along the outer surface as the gas spring assembly is axially displaced between extended and compressed conditions, such as may occur during dynamic use in operation. It will be appreciated that other shapes and/or configurations of outer support wall 480 and/or outer surface 482 can alternately be used, such as may be useful to provide desired performance characteristics, for example.

As is well known in the art, it is generally desirable to avoid or at least minimize contact between end members of a gas spring assembly, such as may occur due to variations in load conditions and/or upon deflation of the gas spring assembly, for example. As such, gas spring assembly 400 is shown in FIGS. 7 and 8 as including a jounce bumper 486 (FIG. 8) that is disposed within spring chamber 408 and supported on end member 404. As identified in FIG. 8, jounce bumper 486 is shown as including a mounting plate 488 that is disposed in abutting engagement with end member 404, a bumper body 490 supported on the mounting plate, and a wear plate 492 that is supported on at least partially embedded within bumper body 490.

It will be appreciated that jounce bumper 486 can be secured on or along an end member in any suitable manner. As identified in FIG. 8, for example, base plate 432 of end member 404 is shown as including one or more securement features 494, such as may take the form of a plurality of threaded holes, for example. In such case, a corresponding number of one or more securement devices 496, such as one or more threaded fasteners, for example, can extend through one of a corresponding number of holes, openings or other features of the jounce bumper or a component thereof (e.g., mounting plate 488) to secure the jounce bumper on or along the end member.

Gas spring assembly 400 can also, optionally, include a complimentary component that may be dimensioned to or otherwise suitable for abuttingly engaging the jounce bumper or a component thereof (e.g., wear plate 492). In the arrangement shown in FIGS. 7 and 8, gas spring assembly 400 includes a bearing plate 498 that is disposed in abutting engagement along surface 414 of plate wall 410 and is secured on or along end member 402. It will be appreciated that the bearing plate can be attached to the end member in any suitable manner. For example, plate wall 410 of end member 402 can include one or more securement features 500, such as threaded holes, for example, that as may be suitable for receiving a complimentary securement device 502, such as a threaded fastener, for example, to secure the bearing plate on or along the end member.

As discussed above, it will be appreciated, that the ends of flexible spring member 406 can be secured on, along or otherwise interconnected between end members 402 and 404 in any suitable manner. As mentioned above, for example, gas spring assembly 400 can include one or more bead retaining elements that engage at least a portion of the flexible spring member and maintain the flexible spring member in substantially fluid-tight engagement with the corresponding end member (e.g., end member 402). In some cases, a bead retaining element, such as bead retaining element 476, for example, could be used. Alternately, one or more bead retaining features can be formed on or along another component of the gas spring assembly. For example, in the arrangement shown in FIGS. 7 and 8, gas spring assembly 400 includes a lateral support element 504 in accordance with the subject matter of the present disclosure that is configured to engage a portion of flexible spring member 406 during lateral movement of end member 402 relative to end member 404. Additionally, lateral support element 504 can, optionally, be adapted or otherwise configured to secure or otherwise support an end of a flexible wall, such as end 466, for example, on or along an end member, such as end member 402, for example.

As identified in FIG. 9, lateral support element 504 includes an element wall 506 in the form of an endless, annular ring that extends radially between an inward or mounting portion 508 and an outward or support portion 510. As illustrated in the cross-sectional profile shown in FIG. 9, element wall 506 includes a bead-retaining wall portion 512 that extends in a radially-inward direction from along mounting portion 508. Bead-retaining wall portion 512 can have a somewhat hook-shaped cross-sectional profile and can, in some cases, form an innermost radial extent of the lateral support element. In a preferred arrangement, bead-retaining wall portion 512 can retain end 466 of flexible wall 464 in abutting engagement with surface 414 of plate wall 410.

Additionally, it will be appreciated that lateral support element 504 can be secured on or along end member 402 in any suitable manner. As one example, lateral support element 504 can include a plurality of holes or openings 514 extending therethrough that are disposed in spaced relation to one another about element wall 506, such as in peripherally-spaced relation to one another along mounting portion 508 thereof, for example. In such case, plate wall 410 of end member 402 can include a corresponding plurality of holes or openings HLS (FIG. 8) that, together with holes 514, are dimensioned to receive one of a plurality of securement devices 516, such as threaded fastener and threaded nut assemblies, for example. In this manner, lateral support element 504 can be secured on end member 402, and flexible spring member 406 can be operatively secured to the end member such that a substantially fluid-tight seal can be formed therebetween.

With further reference to FIG. 9, element wall 506 of lateral support element 504 is shown as including a mounting surface 518 that is dimensioned or otherwise configured to abuttingly engage an associated component or structural feature, such as plate wall 410 of end member 402, for example. Element wall 506 also includes an outer surface 520 along support portion 510 that can have any suitable shape and/or configuration, such as a frustoconical shape, for example. Element wall 506 can include an outer peripheral wall portion 522 that, in some cases, can at least partially define an outermost peripheral extend to lateral support element 504. A lateral support element in accordance with the subject matter of the present disclosure also includes a support surface having a cross-sectional profile suitable for improving stability and/or control of the gas spring assembly during lateral (i.e., transverse) movement of the end members relative to one another.

As identified in FIG. 9, element wall 506 of lateral support element 504 includes a support surface 524 that is positioned to abuttingly engage a portion of flexible spring member 406 during lateral (i.e., transverse) movement of end member 402 relative to end member 404 and thereby at least partially form another example of an interface 525 in accordance with the subject matter of the present disclosure. It will be appreciated that end members 402 and 404 are shown in FIG. 7 in an approximately coaxial or aligned condition, and are shown in FIG. 8 as being moved in a lateral direction into an offset or laterally-shifted condition, such as is represented in FIG. 8 by reference arrows MVT. It will be appreciated that, in a preferred embodiment, flexible spring member 406 is separated or otherwise spaced apart from at least a portion of support surface 524 of lateral support element 504 when end members 402 and 404 are disposed toward a neutral, centered, coaxial or otherwise at least approximately aligned condition, such as is shown and identified in FIG. 7 by arrows SP1, for example. As end members 402 and 404 are laterally displaced relative to one another toward an offset or laterally-shifted condition, flexible wall 406 will further separate from support surface 524 along or otherwise around a first circumferential portion of lateral support element 504, such as is shown and identified in FIG. 8 by arrow SP2. Additionally, as end members 402 and 404 are laterally displaced relative to one another toward an offset or laterally-shifted condition, flexible wall 406 will come into increased contact with support surface 524 along or otherwise around a second, different circumferential portion of lateral support wall 504, such as is shown and identified in FIG. 8 by arrow NSP. In many cases, the first and second circumferential portions of support surface 524 and/or lateral support wall 504 will be disposed generally opposite one another.

With further reference to FIG. 9, support surface 524 includes a cross-sectional profile having two or more sections or portions that extend peripherally about element wall 506 of lateral support element 504. Support surface 524 at least partially defines an annular groove or cavity 526 that extends into element wall 506, such as is illustrated by reference line RLN that extends in a direction generally transverse (e.g., perpendicular) to axis AX and/or in approximate alignment with mounting surface 518.

In the arrangement shown in FIGS. 7-9, the cross-sectional profile of support surface 524 can, optionally, include a first profile section 528 that extends from a first profile point 530 toward a second profile point 532 and forms a reverse or negative taper area that extends annularly around element wall 506. In a preferred arrangement, first profile section 528 can have an approximately linear shape and can extend from point 530 toward point 532 at an angle AG1 relative to reference line RLN. In such case, the reverse or negative taper area formed along element wall 506 can have an approximately frustoconical shape. Generally, the reverse or negative taper area that is at least partially defined by first profile section 528 can, in some cases, provide for reduced lateral stiffness of the gas spring assembly, such as may occur during lateral deflection of the end members relative to one another under which at least a portion of flexible wall 406 contacts or otherwise abuttingly engages a portion of the reverse or negative taper area.

The cross-sectional profile of support surface 524 can also, optionally, include a second profile section 534 that extends from approximately second profile point 532 toward a third profile point 536 and forms a sustaining load area that extends annularly around element wall 506. In a preferred arrangement, second profile section 534 can have a radial or otherwise curvilinear shape. In such case, the sustaining load area formed along element wall 506 can have a curved, annular shape. Generally, the sustaining load area that is at least partially defined by second profile section 534 can, in some cases, provide for a relatively constant lateral stiffness of the gas spring assembly as relative lateral deflection of the end members occurs such that at least a portion of flexible wall 406 contacts or otherwise abuttingly engages a portion of the sustaining load area. It will be appreciated, that the lateral stiffness of the gas spring assembly during contact along second profile section 534 may vary within a range that is substantially reduced from the variations in lateral stiffness associated with the negative taper area. As one example, a variation of less than 20 percent of the total variation of the negative taper area could be provided by the sustaining load area.

The cross-sectional profile of support surface 524 can also, optionally include a third profile section 538 that extends from approximately third profile point 536 toward a fourth profile point 540 and forms a returning curvature area that extends annularly around element wall 506. In a preferred arrangement, third profile section 538 can have a radial or otherwise curvilinear shape. In such case, the returning curvature area formed along element wall 506 can have a curved, annular shape. Generally, the returning curvature area that is at least partially defined by third profile section 538 can, in some cases, provide for an increasing lateral stiffness of the gas spring assembly as relative lateral deflection of the end members occurs, such as when at least a portion of flexible wall 506 contacts or otherwise abuttingly engages a portion of the returning curvature area.

While both profile sections are described as including a radial or otherwise curvilinear shape, it will be appreciated that second profile section 534 and third profile section 538 differ in at least two respects. As one example, second profile section 534 is shown as extending between profile points 532 and 536 that are disposed in approximate alignment with one another with respect to reference line RLN. Additionally, second profile section 534 has a distal extent that is spaced a first distance from profile points 532 and 536, as is represented in FIG. 9 by reference dimension D1.

Whereas, third profile section 538 is shown as extending between profile points 536 and 540 that are disposed in axially spaced relation to one another, as is represented in FIG. 9 by reference dimension D2.

It has been determined that variations in relative positions along support surface 524 in the axial direction can generally correspond to variations in lateral stiffness. As such, the minimal overall variation in axial position along second profile section 534, as represented by dimension D1, can roughly correspond to a minimal or nearly constant lateral stiffness along the second profile section. Accordingly, the greater overall variation in axial position along third profile section 538, as represented by dimension D2, can roughly correspond to a significant increase in lateral stiffness along the third profile section in the direction from third point 536 toward fourth point 540.

As a second example, second profile section 534 is shown as including a center of curvature CV1 that is disposed along a side 542 of lateral support element 504 from along which cavity 526 extends into element wall 506. Whereas, third profile section 538 is shown as including a center of curvature CV2 that is disposed along an opposing side 544 of lateral support element 504, such as may be adjacent mounting surface 518, for example. As such, the rate of change of profile sections 534 and 538 differ as the flexible wall is displaced laterally therealong in a direction from first profile point 530 toward fourth profile point 540. Additionally, it will be appreciated that the radial or otherwise curved shape of profile sections 534 and 538 can take the form of suitable geometric configuration, whether regular or irregular, and can vary along the respective lengths thereof.

In some cases, the cross-sectional profile of support surface 524 can also, optionally, include a fourth profile section 546 extends from approximately fourth profile point 540 toward an outermost peripheral point 548. In some cases, a transition section 550 can extend from approximately fourth profile point 540 to a fifth profile point 552 with fourth profile section 546 extending from approximately fifth profile point 552 toward outermost peripheral point 548. In a preferred arrangement, fourth profile section 546, if included, can have an approximately linear shape and can extend at an angle AG2 relative to reference line RLN. In such case, a forward or positive taper area can be formed along element wall 506 that can have an approximately frustoconical shape. Generally, the forward or positive taper area that is at least partially defined by fourth profile section 546 can, in some cases, provide for further increased lateral stiffness of the gas spring assembly, such as may occur during lateral deflection of the end members relative to one another under which at least a portion of flexible wall 406 contacts or otherwise abuttingly engages a portion of the forward or positive taper area.

Figure 10:
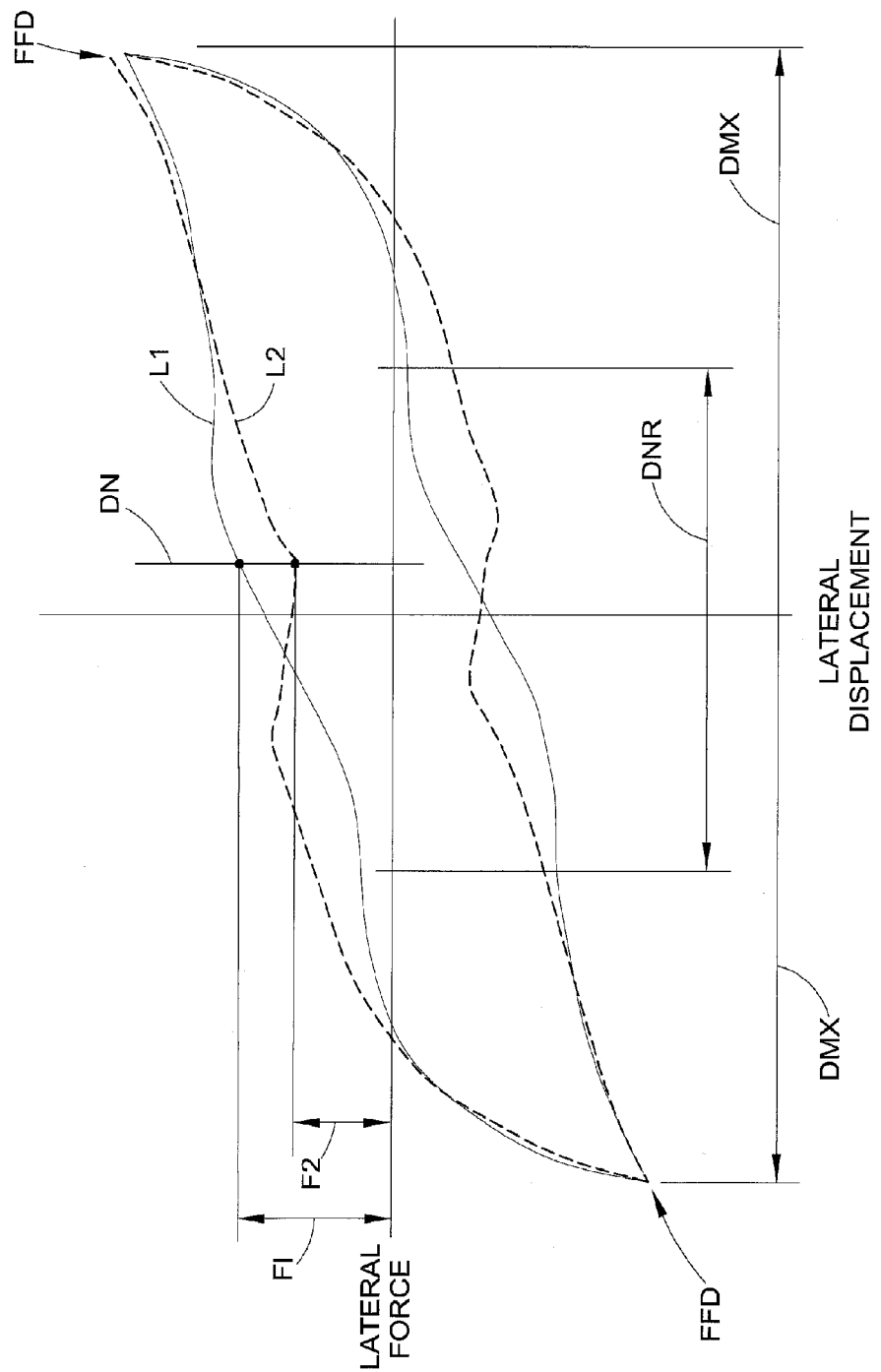
FIG. 10 is a graphical representation of a lateral force versus lateral displacement curve associated with the use of an interface and lateral support element in accordance with the subject matter of the present disclosure.

FIG. 10 is a graphical representation of a lateral force versus lateral displacement curve for a conventional lateral support element, which is represented in FIG. 10 by solid line L1, and an anticipated lateral force versus lateral displacement curve for an interface and/or a lateral support element in accordance with the subject matter of the present disclosure, such as one of interfaces 334, 340 and/or 525 and/or one of lateral support elements 304, 342 and/or 504, for example, which is represented in FIG. 10 by dashed line L2. As can be observed from the graphical representation, at a given lateral displacement, which is represented in FIG. 10 by displacement line DN, a conventional lateral support element can have a lateral stiffness or force that corresponds to reference dimension F1. Whereas, an interface and/or lateral support element in accordance with the subject matter of the present disclosure, such as one of interfaces 334, 340 and/or 525 and/or one of lateral support elements 304, 342 and/or 504, for example, may have an anticipated lateral stiffness or force that corresponds to a reference dimension F2. As such, for a given lateral displacement within a normal range of displacement, which is represented in FIG. 10 by reference dimension DNR, an interface and/or lateral support element in accordance with the subject matter of the present disclosure can have a lower lateral stiffness or force than that of a conventional lateral support element. As can also be observed from the graphical representation in FIG. 10, however, under conditions of maximum lateral displacement, such as are represented by reference dimensions DMX, an interface and/or lateral support element in accordance with the subject matter of the present disclosure, such as one of interfaces 334, 340 and/or 525 and/or one of lateral support elements 304, 342 and/or 504, for example, may have anticipated lateral stiffness or force that is approximately equal to the lateral stiffness or force of a conventional lateral support element, such as is represented in FIG. 10 by reference points FFD.

Figure 11:
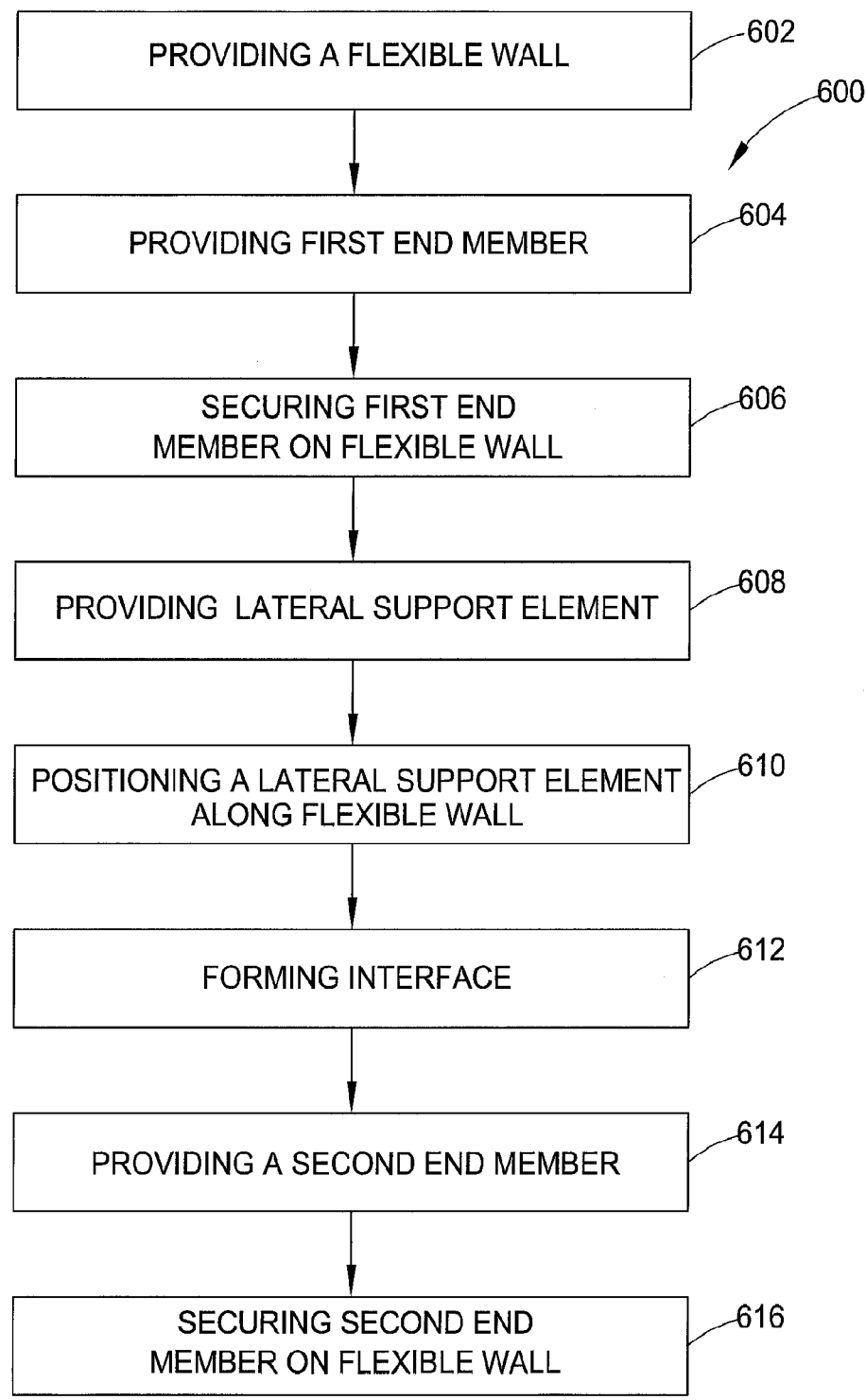
FIG. 11 is a graphical representation of one example of a method of manufacturing a gas spring assembly in accordance with the subject matter of the present disclosure.

One example of a method 600 of manufacturing a gas spring assembly in accordance with the subject matter of the present disclosure, such as one of gas spring assemblies 120, 200 and/or 400, for example, is shown in FIG. 11 as including providing a flexible wall, such as flexible wall 264 of flexible spring member 206 and/or flexible wall 464 of flexible spring member 406, as is represented in FIG. 11 by item number 602. Method 600 also includes providing a first end member, such as end member 202 and/or 402, for example, as is represented by item number 604. Method 600 can further include securing a first end of the flexible wall on or along the first end member, as is represented that item number 606. Method 600 can also include providing a lateral support element, such as lateral support element 304, 342 and/or 504, for example, as is represented in FIG. 11 by item number 608.

Method 600 can further include positioning the lateral support element on, along or otherwise adjacent the flexible wall, as is represented in FIG. 11 by item number 610. Method 600 can also include forming an interface, such as interface 334, 340 and/or 525, for example, such as is represented by item number 612. Method 600 can further include providing a second end member, such as end member 204 and/or 404, for example, as is represented by item number 614. Method 600 can further include securing the second end member on or along an end of the flexible wall to at least partially form a spring chamber, such as spring chamber 208 and/or 408, for example, as is represented in FIG. 11 by item number 616.

As used herein with reference to certain features, elements, components and/or structures, numerical ordinals (e.g., first, second, third, fourth, etc.) may be used to denote different singles of a plurality or otherwise identify certain features, elements, components and/or structures, and do not imply any order or sequence unless specifically defined by the claim language. Additionally, the terms "transverse," and the like, are to be broadly interpreted. As such, the terms "transverse," and the like, can include a wide range of relative angular orientations that include, but are not limited to, an approximately perpendicular angular orientation. Also, the terms "circumferential," "circumferentially," and the like, are to be broadly interpreted and can include, but are not limited to circular shapes and/or configurations. In this regard, the terms "circumferential," "circumferentially," and the like, can be synonymous with terms such as "peripheral," "peripherally," and the like.

Furthermore, the phrase "flowed-material joint" and the like, if used herein, are to be interpreted to include any joint or connection in which a liquid or otherwise flowable material (e.g., a melted metal or combination of melted metals) is deposited or otherwise presented between adjacent component parts and operative to form a fixed and substantially fluid-tight connection therebetween. Examples of processes that can be used to form such a flowed-material joint include, without limitation, welding processes, brazing processes and soldering processes. In such cases, one or more metal materials and/or alloys can be used to form such a flowed-material joint, in addition to any material from the component parts themselves. Another example of a process that can be used to form a flowed-material joint includes applying, depositing or otherwise presenting an adhesive between adjacent component parts that is operative to form a fixed and substantially fluid-tight connection therebetween. In such case, it will be appreciated that any suitable adhesive material or combination of materials can be used, such as one-part and/or two-part epoxies, for example.

Further still, the term "gas" is used herein to broadly refer to any gaseous or vaporous fluid. Most commonly, air is used as the working medium of gas spring devices, such as those described herein, as well as suspension systems and other components thereof. However, it will be understood that any suitable gaseous fluid could alternately be used.

It will be recognized that numerous different features and/or components are presented in the embodiments shown and described herein, and that no one embodiment may be specifically shown and described as including all such features and components. As such, it is to be understood that the subject matter of the present disclosure is intended to encompass any and all combinations of the different features and components that are shown and described herein, and, without limitation, that any suitable arrangement of features and components, in any combination, can be used. As one example, it will be appreciated that any combination of features, properties and/or characteristics from any one of more of interfaces 334, 340 and/or 525 and from any one or more of lateral support elements 304, 342 and/or 504 can be used in any suitable configuration and/or arrangement. Thus it is to be distinctly understood claims directed to any such combination of features and/or components, whether or not specifically embodied herein, are intended to find support in the present disclosure.

Thus, while the subject matter of the present disclosure has been described with reference to the foregoing embodiments and considerable emphasis has been placed herein on the structures and structural interrelationships between the component parts of the embodiments disclosed, it will be appreciated that other embodiments can be made and that many changes can be made in the embodiments illustrated and described without departing from the principles hereof. Obviously, modifications and alterations will occur to others upon reading and understanding the preceding detailed description. Accordingly, it is to be distinctly understood that the foregoing descriptive matter is to be interpreted merely as illustrative of the subject matter of the present disclosure and not as a limitation. As such, it is intended that the subject matter of the present disclosure be construed as including all such modifications and alterations.

The invention claimed is:

1. A gas spring assembly comprising:
a flexible wall having a longitudinal axis and extending peripherally about said longitudinal axis between a first end and a second end spaced longitudinally from said first end, said flexible wall including an inner surface and an outer surface with said inner surface at least partially defining a spring chamber; and,
a lateral support element including an element wall with a first surface facing away from said flexible wall and a second surface facing toward said flexible wall, said lateral support element disposed along said first end of said flexible wall such that an interface is formed between said outer surface of said flexible wall and said second surface of said lateral support element, said interface operative to generate a lateral spring-rate profile that varies according to lateral displacement of said flexible wall and said lateral support element relative to one another, said second surface of said lateral support element having a reference plane disposed transverse to said longitudinal axis and including a cross-sectional profile extending from an inner profile endpoint to an outer profile endpoint, said cross-sectional profile including:
a first profile segment extending radially-outward and substantially linearly from said inner profile endpoint at a first angle relative to said reference plane;
a second profile segment disposed radially outward of said first profile segment and extending radially-outward toward said outer profile endpoint, said second profile segment having a concave shape facing toward said second end of said flexible wall;
a third profile segment disposed radially outward of said second profile segment and extending radially-outward toward said outer profile endpoint, said third profile segment having a convex shape facing toward said second end of said flexible wall; and,
a fourth profile segment disposed radially outward of said third profile segment, said fourth profile segment extending radially-outward and substantially linearly from adjacent said third profile segment at a second angle relative to said reference plane.

2. A gas spring assembly according to claim 1, wherein said gas spring assembly is laterally displaceable between a neutral position and a laterally-offset position such that in said neutral position said second end of said flexible wall and said lateral support element are disposed approximately coaxial alignment with one another and in said laterally-offset position said second end of said flexible wall and said lateral support element are disposed in laterally-spaced apart relation to one another.

3. A gas spring assembly according to claim 2, wherein a portion of said outer surface of said flexible wall is disposed in abutting engagement with an annular area of said second surface of said lateral support element in said neutral position.

4. A gas spring assembly according to claim 2, wherein at least a portion of said outer surface of said flexible wall is disposed in spaced relation to said second surface of said lateral support element in said neutral position.

5. A gas spring assembly according to claim 2, wherein a portion of an annular area of said outer surface of said flexible wall is disposed in abutting engagement with a portion of an annular area of said second surface of said lateral support element and the remaining portion of said annular area of said outer surface of said flexible wall is disposed in spaced relation to the remaining portion of said annular area of said second surface of said lateral support element in said laterally-offset position.

6. A gas spring assembly according to claim 1, wherein a friction-reducing material is disposed along said interface between at least a portion of said flexible wall and said lateral support element.

7. A gas spring assembly according to claim 6, wherein said outer surface of said flexible wall and said second surface of said lateral support element have a first coefficient of friction therebetween and said friction-reducing material generates an area along said interface having a second coefficient of friction that is less than said first coefficient of friction.

8. A gas spring assembly according to claim 7, wherein said friction-reducing material includes at least one of a quantity of free material applied to at least one of said flexible wall and said lateral support element, a surface treatment applied to at least one of said flexible wall and said lateral support element, and a friction-reducing component secured to one of said flexible wall and said lateral support element.

9. A gas spring assembly according to claim 8, wherein said friction-reducing material includes a quantity of free material in the form of at least one of a liquid, a semi-solid and a solid lubricant.

10. A gas spring assembly according to claim 8, wherein said friction-reducing material includes a surface treatment that includes at least one of a polymeric coating and a nearly-frictionless-carbon coating applied to at least a portion of at least one surface of at least one of said flexible wall and said lateral support element.

11. A gas spring assembly according to claim 8, wherein said friction-reducing material includes a friction-reducing component secured to said second surface of said lateral support element, said friction-reducing component being at least partially formed from one or more of a polymeric material and nearly frictionless carbon (NFC) coating disposed along a substrate.

12. A gas spring assembly according to claim 1 further comprising:
a first end member secured across said first end of said flexible wall and operatively associated with said lateral support element; and,
a second end member secured across said second end of said flexible wall such that said spring chamber is at least partially defined by said flexible wall between said first and second end members.

13. A gas spring assembly according to claim 12, wherein at least a portion of said first end of said flexible wall is disposed between said first end member and said lateral support element to at least partially secure said flexible wall on said first end member.

14. A gas spring assembly comprising:
a flexible wall having a longitudinal axis and extending peripherally about said longitudinal axis between a first end and a second end spaced longitudinally from said first end, said flexible wall including an inner surface and an outer surface with said inner surface at least partially defining a spring chamber;
a first end member secured across said first end of said flexible wall;
a second end member secured across said second end of said flexible wall such that said spring chamber is at least partially defined by said flexible wall between said first and second end members; and,
a lateral support element disposed along and operatively associated with said first end member and said first end of said flexible wall, said lateral support element including an element wall with a first surface facing away from said flexible wall and a second surface facing toward said flexible wall such that an interface is formed between said outer surface of said flexible wall and said second surface of said lateral support element that is operative to generate a lateral spring-rate profile that varies according to lateral displacement of said flexible wall and said lateral support element relative to one another by including one of:
a friction-reducing material is disposed along said interface between at least a portion of said flexible wall and said lateral support element; and,
a cross-sectional profile extending along a reference plane disposed transverse to said longitudinal axis from an inner profile endpoint to an outer profile endpoint with said cross-sectional profile including:
a first profile segment extending radially-outward and substantially linearly from said inner profile endpoint at a first angle relative to said reference plane;
a second profile segment disposed radially outward of said first profile segment and extending radially-outward toward said outer profile endpoint, said second profile segment having a concave shape facing toward said second end of said flexible wall;
a third profile segment disposed radially outward of said second profile segment and extending radially-outward toward said outer profile endpoint, said third profile segment having a convex shape facing toward said second end of said flexible wall; and,
a fourth profile segment disposed radially outward of said third profile segment, said fourth profile segment extending radially-outward and substantially linearly from adjacent said third profile segment at a second angle relative to said reference plane.

15. A gas spring assembly according to claim 14, wherein said outer surface of said flexible wall and said second surface of said lateral support element have a first coefficient of friction therebetween and said friction-reducing material generates an area along said interface having a second coefficient of friction that is less than said first coefficient of friction.

16. A gas spring assembly according to claim 14, wherein said friction-reducing material includes at least one of a quantity of free material applied to at least one of said flexible wall and said lateral support element, a surface treatment applied to at least one of said flexible wall and said lateral support element, and a friction-reducing component secured to one of said flexible wall and said lateral support element.

17. A gas spring assembly comprising:
a flexible wall having a longitudinal axis and extending peripherally about said longitudinal axis between a first end and a second end spaced longitudinally from said first end, said flexible wall including an inner surface and an outer surface with said inner surface at least partially defining a spring chamber;
a first end member secured across said first end of said flexible wall;
a second end member secured across said second end of said flexible wall such that said spring chamber is at least partially defined by said flexible wall between said first and second end members; and,
a lateral support element disposed along and operatively associated with said first end member and said first end of said flexible wall, said lateral support element including an element wall with a first surface facing away from said flexible wall and a second surface facing toward said flexible wall such that an interface is formed between said outer surface of said flexible wall and said second surface of said lateral support element that is operative to generate a lateral spring-rate profile that varies according to lateral displacement of said flexible wall and said lateral support element relative to one another, said element wall of said lateral support element including a cross-sectional profile extending along a reference plane disposed transverse to said longitudinal axis from an inner profile endpoint to an outer profile endpoint with said cross-sectional profile including:

a first profile segment extending radially-outward and substantially linearly from said inner profile endpoint at a first angle relative to said reference plane;

a second profile segment disposed radially outward of said first profile segment and extending radially-outward toward said outer profile endpoint, said second profile segment having a concave shape facing toward said second end of said flexible wall;

a third profile segment disposed radially outward of said second profile segment and extending radially-outward toward said outer profile endpoint, said third profile segment having a convex shape facing toward said second end of said flexible wall; and, a fourth profile segment disposed radially outward of said third profile segment, said fourth profile segment extending radially-outward and substantially linearly from adjacent said third profile segment at a second angle relative to said reference plane.

18. A gas spring assembly according to claim 17, wherein said gas spring assembly is laterally displaceable between a neutral position and a laterally-offset position such that in said neutral position said second end of said flexible wall and said lateral support element are disposed approximately coaxial alignment with one another and in said laterally-offset position said second end of said flexible wall and said lateral support element are disposed in laterally-spaced apart relation to one another with a portion of said outer surface of said flexible wall disposed in abutting engagement with an annular area of said second surface of said lateral support element in said neutral position.

19. A gas spring assembly according to claim 17, wherein said gas spring assembly is laterally displaceable between a neutral position and a laterally-offset position such that in said neutral position said second end of said flexible wall and said lateral support element are disposed approximately coaxial alignment with one another and in said laterally-offset position said second end of said flexible wall and said lateral support element are disposed in laterally-spaced apart relation to one another with at least a portion of said outer surface of said flexible wall disposed in axially-spaced relation to said second surface of said lateral support element in said neutral position.

20. A gas spring assembly according to claim 17, wherein said gas spring assembly is laterally displaceable between a neutral position and a laterally-offset position with a portion of an annular area of said outer surface of said flexible wall disposed in abutting engagement with a portion of an annular area of said second surface of said lateral support element and the remaining portion of said annular area of said outer surface of said flexible wall disposed in spaced relation to the remaining portion of said annular area of said second surface of said lateral support element in said laterally-offset position.

* * * * *